(12) United States Patent
Yanagida et al.

(10) Patent No.: US 6,604,989 B2
(45) Date of Patent: *Aug. 12, 2003

(54) MANUFACTURING METHOD AND APPARATUS FOR MAGNETIC HEAD SLIDERS

(75) Inventors: Yoshiaki Yanagida, Kawasaki (JP); Koji Sudo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/768,682

(22) Filed: Jan. 24, 2001

(65) Prior Publication Data

US 2002/0016130 A1 Feb. 7, 2002

(30) Foreign Application Priority Data

Jul. 28, 2000 (JP) .......................................... 2000-228667

(51) Int. Cl.[7] ................................................ B24B 7/00
(52) U.S. Cl. ....................... 451/272; 451/278; 451/279; 451/232
(58) Field of Search ............................. 451/5, 41, 232, 451/272, 278, 279, 366

(56) References Cited

U.S. PATENT DOCUMENTS

| 5,023,991 | A | * | 6/1991 | Smith .................... 29/603.09 |
| 5,203,119 | A | | 4/1993 | Cole |
| 5,607,340 | A | | 3/1997 | Lackey et al. |
| 5,607,346 | A | * | 3/1997 | Wilson et al. ............. 451/540 |
| 6,074,283 | A | | 6/2000 | Maeda et al. |
| 6,315,636 | B1 | * | 11/2001 | Yanagida et al. ............ 451/11 |
| 6,375,539 | B1 | * | 4/2002 | Sudo et al. .................... 451/5 |

FOREIGN PATENT DOCUMENTS

| JP | 5-123960 | 5/1993 |
| JP | 6-349222 | 12/1994 |
| JP | 10-277469 | 10/1998 |

* cited by examiner

Primary Examiner—Dung Van Nguyen
(74) Attorney, Agent, or Firm—Greer, Burns & Crain, Ltd.

(57) ABSTRACT

Disclosed herein is a method including the steps of cutting a wafer to prepare a row block having a plurality of head elements arranged in a matrix, bonding a plate member to one side surface of the row block, bonding a row tool to another side surface of the row block bonded to the plate member opposite to the one side surface, and cutting the row block to prepare a row bar bonded to the row tool and having a row of the head elements. A bonding apparatus for realizing the above bonding steps is also disclosed.

9 Claims, 44 Drawing Sheets

F I G. 34
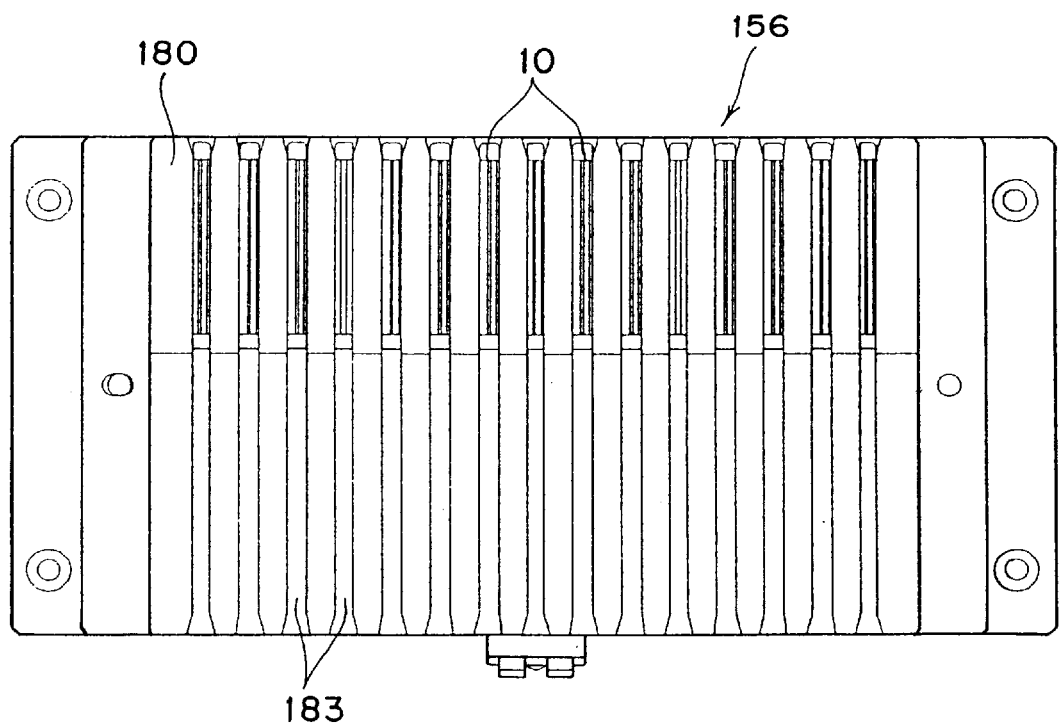

MANUFACTURING METHOD AND APPARATUS FOR MAGNETIC HEAD SLIDERS

BACKGROUND OF THE INVENTION

1. Field of the Invention

The present invention relates to a method and apparatus suitable for mass production of uniform magnetic head sliders.

2. Description of the Related Art

In a manufacturing process for a magnetic head slider, for example, a magnetic head thin-film is formed on a substrate, and is thereafter subjected to lapping. In this lapping, the heights of a magnetic resistance layer and a gap in the magnetic head thin-film are made constant. The heights of the magnetic resistance layer and the gap are required to have a high accuracy on the order of submicrons. Accordingly, a high working accuracy is required in a lapping apparatus for lapping a row bar as a workpiece.

A conventional magnetic head manufacturing process includes the steps of cutting a wafer to prepare a row bar having a plurality of magnetic head elements arranged in a row, and bonding the row bar to a row tool. This bonding step is carried out by using a bonding apparatus disclosed in Japanese Patent Laid-open No. 10-277469, for example. This bonding apparatus is composed of an adhesive applying mechanism for applying an adhesive in a given amount to the row tool, a rinking mechanism for uniforming the adhesive between the row tool and the row bar, and a presser mechanism for accelerating the curing of the adhesive in the condition where the row tool and the row bar are positioned. In Japanese Patent Laid-open No. 6-349222, there is proposed a method including the steps of bonding a plurality of row bars to a row tool, and thereafter cutting off one of the row bars. However, in this conventional method, the rigidity of the workpiece is reduced with the repetition of the cutting step, causing an adverse effect on the straightness of the workpiece.

As mentioned above, the magnetic head slider is subjected to lapping so that the height of the magnetic resistance film becomes constant. However, the row bar is very thin such that its thickness is about 0.3 mm. Accordingly, it is difficult to directly lap the row bar by the lapping apparatus, so that the row bar bonded to the row tool is pressed on a lap plate in lapping. During the lapping operation, a resistance in an electrical lapping guide element (ELG element) integrally formed in the row bar is always measured as known in U.S. Pat. No. 5,023,991 and Japanese Patent Laid-open No. 5-123960, for example.

Then, whether or not the height of the magnetic resistance film of each magnetic head element in the row bar has become a target height is detected according to the measured resistance. When it is detected that the magnetic resistance film has been lapped to the target height, according to the measured resistance, the lapping operation is ended. Thereafter, the lapped surface of the row bar is worked to form flying surfaces of a plurality of magnetic head sliders. Then, the row bar is cut into parts having the plurality of magnetic head sliders. Finally, the row tool is heated to melt the adhesive bonding the row bar to the row tool, thereby produce the individual magnetic head sliders.

In this manner, a wafer is first cut to prepare a row bar having a plurality of magnetic head elements arranged in a row, and the row bar is then lapped to thereby allow simultaneous lapping of the magnetic resistance films of the plural magnetic head elements. However, there are variations on the order of submicrons in the height of the magnetic resistance film between the individual magnetic head elements in the row bar, according to the film forming accuracy of the magnetic resistance film or the bonding accuracy of the row bar to the row tool. Accordingly, such variations must be corrected in lapping the row bar, so as to mass-produce magnetic head sliders having uniform characteristics.

Various methods have conventionally been proposed to correct the variations on the order of submicrons in lapping. For example, U.S. Pat. No. 5,607,346 has proposed a method including the steps of forming a plurality of holes in a row tool and respectively applying forces of actuators through the holes to the row tool. However, each actuator is required to have a capability of applying a relatively large force, so as to obtain a desired pressure distribution. Accordingly, it is difficult to manufacture such actuators for applying operational forces to the row tool at multiple points, so that the spacing of these multiple points (holes) cannot be so decreased. As a result, it is difficult to improve the working (lapping) accuracy of the row bar.

SUMMARY OF THE INVENTION

It is therefore an object of the present invention to provide a bonding method and apparatus which can prevent the warpage and/or distortion of a row bar bonded to a row tool.

It is another object of the present invention to provide a lapping apparatus, row tool, and lapping method suitable for improvement in working accuracy.

In accordance with an aspect of the present invention, there is provided a method comprising the steps of cutting a wafer to prepare a row block having a plurality of head elements arranged in a matrix; bonding a plate member to one side surface of said row block; bonding a row tool to another side surface of said row block bonded to said plate member opposite to said one side surface; and cutting said row block to prepare a row bar bonded to said row tool and having a row of said head elements.

Preferably, said plate member comprises a dummy wafer. Preferably, the above method further comprises the steps of bonding another row tool to a cut surface of said row block remaining after said cutting step; and repeating said cutting step for said remaining row block.

In accordance with another aspect of the present invention, there is provided an apparatus for bonding a row block having a plurality of head elements arranged in a matrix to a plate member, comprising a carrier block having a positioning pin for positioning said row block; a first preheating assembly for preheating said plate member; a second preheating assembly for preheating said row block; a rail assembly having a first block for mounting said plate member and a second block for substantially vertically holding said plate member in cooperation with said first block; an adhesive applying assembly for applying an adhesive to one side surface of said plate member held in said rail assembly; a rinking assembly having a rinking base for mounting said carrier block, a clamper for clamping said plate member mounted on said carrier block, a drive mechanism for reciprocating said clamper, and a first presser block for pressing said row block mounted on said carrier block against said one side surface of said plate member; and a bonding assembly having a bonding base for mounting said carrier block, a positioning block for positioning said plate member and said row block mounted on said carrier block, a second presser block for pressing said row block against said one side surface of said plate member, and an air nozzle for spraying air to a bonding portion between said row block and said plate member.

Preferably, said carrier block is in L-shaped configuration and has a hole for vacuum suction. The first preheating assembly has a first heating block having a plurality of grooves each for receiving said plate member, and a first heater for heating said first heating block. The second preheating assembly has a second heating block for placing said row block, and a second heater for heating said second heating block.

Preferably, said first block of said rail assembly is in L-shaped configuration, and said rail assembly further has a third block for pushing one end of said plate member mounted on said L-shaped first block, and a third heater for heating said first block. The adhesive applying assembly has a syringe for dispensing said adhesive, a temperature control block for heating said syringe to a given temperature, a cylinder for vertically moving said syringe, and a robot for moving said syringe along said rail assembly.

Preferably, said drive mechanism of said rinking assembly has a motor, a rinking stroke adjusting disc mounted on said motor, and a connecting rod for connecting said rinking stroke adjusting disc and said damper and having a connecting end offset from an output shaft of said motor.

In accordance with a further aspect of the present invention, there is provided an apparatus for lapping a row bar having a plurality of head elements arranged in a row, comprising a lap plate for providing a lapping surface; a row tool having an upper surface, a lower surface to which said row bar is bonded, and a plurality of bend cells formed by a plurality of slits; an air plate fixed to said upper surface of said row tool and having a plurality of holes respectively corresponding to said plurality of bend cells; a presser mechanism for pressing said row bar bonded to said lower surface of said row tool against said lapping surface of said lap plate; a plurality of electro-pneumatic conversion regulators respectively connected to said plurality of holes of said air plate; and a compressed air source connected to said plurality of electro-pneumatic conversion regulators.

The row tool further has a parallel spring mechanism and a pair of fixed cells formed on the opposite sides of said bend cells, each of said fixed cells having a width larger than that of each of said bend cells. Preferably, the upper surface of said row tool and the lower surface of said air plate are polished so as to have a flatness of 3 $\mu$m or less. Preferably, said presser mechanism has a lap head for pressing said row bar on said lapping surface by a self-weight, and a pneumatic cylinder for adjustably applying a lapping pressure to said lap head.

In accordance with a still further aspect of the present invention, there is provided a method of lapping a row bar having a plurality of head elements arranged in a row, comprising the steps of providing a lapping surface by a lap plate; pressing said row bar bonded to a lower surface of a row tool having a plurality of bend cells formed by a plurality of slits, against said lapping surface; and applying individually adjustable air pressures to said bend cells, respectively, through an air plate fixed to an upper surface of said row tool and having a plurality of holes respectively corresponding to said bend cells; whereby said row bar is displaced at multiple points in lapping.

In accordance with a still further aspect of the present invention, there is provided a row tool to which a row bar having a plurality of head elements arranged in a row is adapted to be bonded, comprising a plurality of bend cells formed by a plurality of slits; a pair of fixed cells formed on the opposite sides of said bend cells, each of said fixed cells having a width larger than that of each of said bend cells; and a parallel spring mechanism.

In accordance with a still further aspect of the present invention, there is provided a row tool assembly comprising a row tool having an upper surface, a plurality of bend cells formed by a plurality of slits, a parallel spring mechanism, an insert hole extending horizontally, and a plurality of first holes communicating with said insert hole and opening to said upper surface; an air lead frame inserted in said insert hole of said row tool and having a plurality of air reservoirs respectively communicating with said first holes of said row tool; and an air plate fixed to said upper surface of said row tool and having a plurality of second holes respectively communicating with said first holes of said row tool.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 34 is a plan view of FIG. 33;

DETAILED DESCRIPTION OF THE PREFERRED EMBODIMENTS

There will first be described a row bar preparation method with reference to FIGS. 1A to 3B. This row bar preparation method includes a row block bonding process shown in FIGS. 1A to 1C, a row tool bonding process shown in FIGS. 2A to 2C, and a row block cutting process shown in FIGS. 3A and 3B.

Figure 1A:
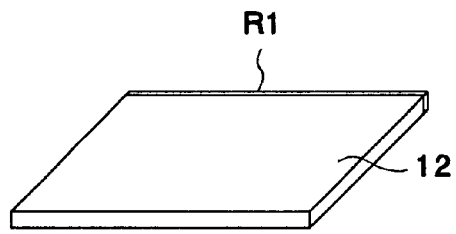
FIGS. 1A to 1C are perspective views for illustrating a process of bonding a row block to a dummy wafer.
Figure 1B:
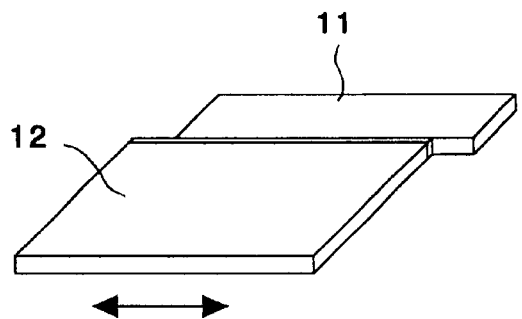

As shown in FIG. 1A, an adhesive R1 is first applied to one side surface of a dummy wafer 12. As shown in FIG. 1B, a row block 11 is next pressed on the side surface of the dummy wafer 12 to which the adhesive R1 has been applied, and the dummy wafer 12 is horizontally reciprocated plural times relative to the row block 11 to uniform the adhesive R1 between the row block 11 and the dummy wafer 12. The row block 11 is provided by cutting a wafer, and has a plurality of magnetic head elements arranged in a matrix. The dummy wafer 12 is formed of the same material as that of the row block 11. The dummy wafer 12 may be replaced by a plate member having a coefficient of thermal expansion equal to or similar to that of the row block 11.

Figure 1C:
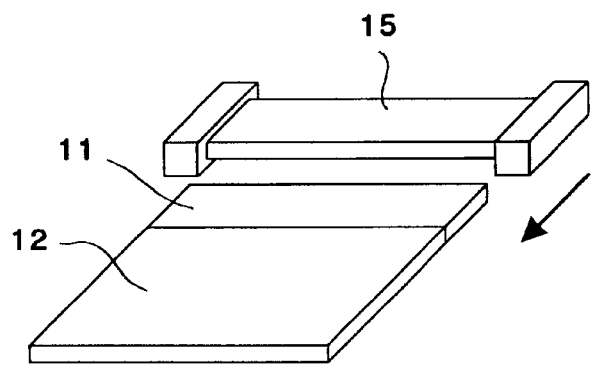

The step shown in FIG. 1B is generally referred to as a rinking step. After the rinking step, a pressure head 15 is pressed on one side surface of the row block 11 opposite to the bonding surface with respect to the dummy wafer 12 as shown in FIG. 1C, and air is sprayed against the bonding portion between the row block 11 and the dummy wafer 12 by using an air nozzle, for example, thereby curing the adhesive R1 to bond the row block 11 to the dummy wafer 12. The reason for bonding of the row block 11 to the dummy wafer 12 is to increase the rigidity of the row block 11.

Figure 2A:
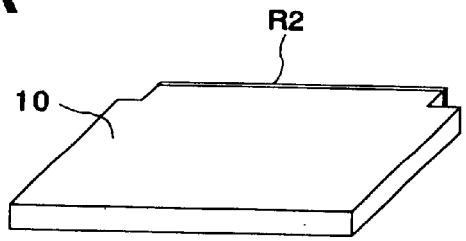
FIGS. 2A to 2C are perspective views for illustrating a process of bonding an integrated block to a row tool.
Figure 2B:
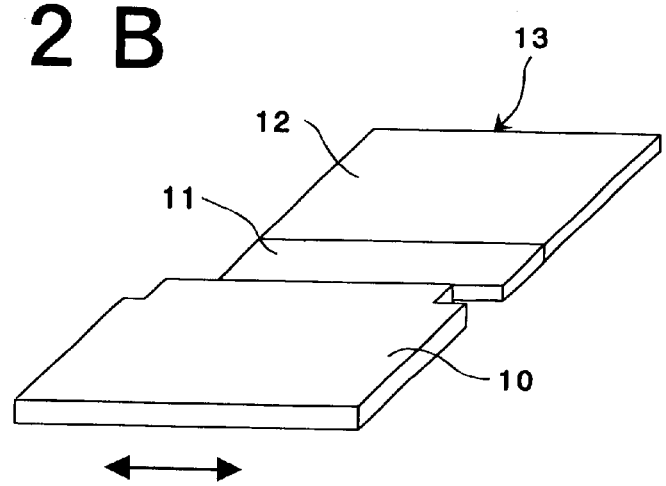
Figure 2C:
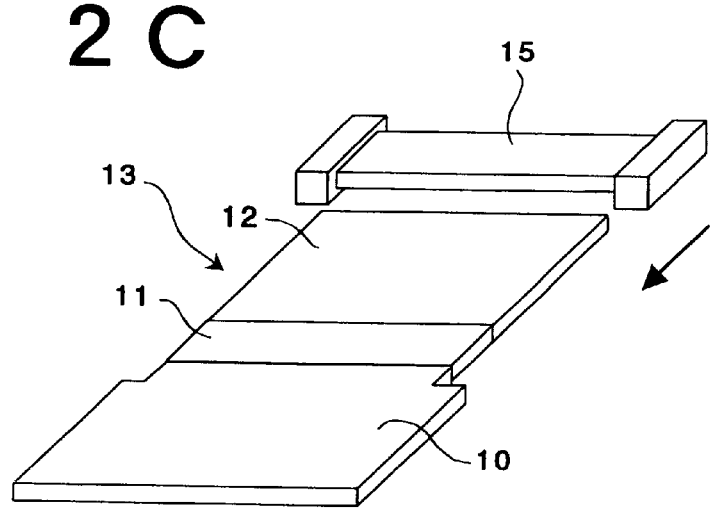

In the next stage, an adhesive R2 is applied to one side surface of a row tool 10 as shown in FIG. 2A. As shown in FIG. 2B, an integrated block 13 prepared by bonding the row block 11 to the dummy wafer 12 as mentioned above is next pressed on the side surface of the row tool 10 to which the adhesive R2 has been applied, and the row tool 10 is horizontally reciprocated plural times relative to the integrated block 13 to uniform the adhesive R2 between the row tool 10 and the integrated block 13. This step is also generally referred to as a rinking step. As shown in FIG. 2C, the pressure head 15 is pressed on one side surface of the integrated block 13 opposite to the bonding surface with respect to the row tool 10, and the adhesive R2 is cured to thereby bond the integrated block 13 to the row tool 10.

Figure 3A:
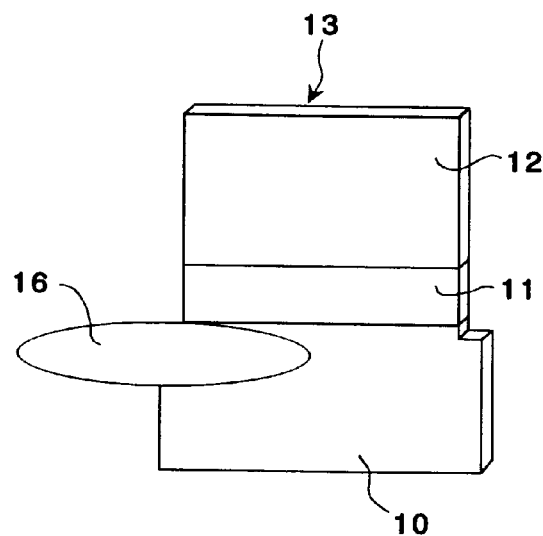
FIGS. 3A and 3B are perspective views for illustrating a process of cutting the row block.
Figure 3B:
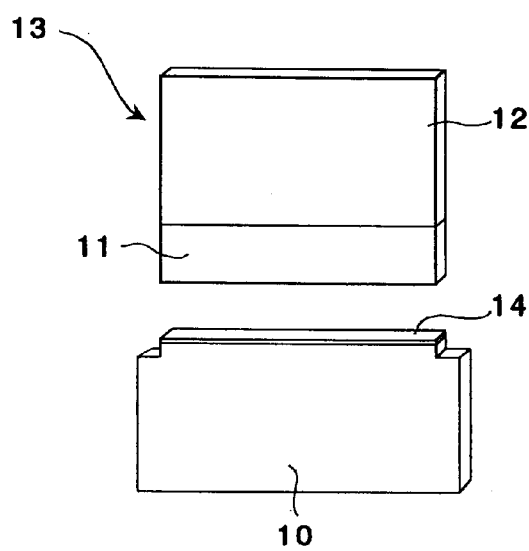

In the next stage, the row block 11 bonded to the row tool 10 is cut by using a slicer 16 as shown in FIG. 3A to thereby obtain a single row bar 14 bonded to the row tool 10 as shown in FIG. 3B. The row bar 14 has a plurality of magnetic head elements arranged in a row. The row bar 14 bonded to the row tool 10 is subjected to a subsequent magnetic head slider manufacturing process such as a lapping process. The remaining integrated block 13 from which the row bar 14 has been separated is bonded to another row tool, and the processes of FIGS. 2A to 3B are repeated.

According to this method, the rigidity of the row block 11 is higher than that of the single row bar 14. Therefore, the warpage of the row block 11 due to the pressure applied in the bonding step and the distortion of the row bar 14 due to the stress in the cutting step can be reduced. Further, according to this method, the dummy wafer 12 is preliminarily bonded to the row block 11 to increase the rigidity of the row block 11. Therefore, even when the cutting of the row block 11 is repeated, the rigidity of the row block 11 is not decreased, thereby preventing an adverse effect on the straightness of the row bar 14 due to the repetition of the cutting of the row block 11.

Figure 4:
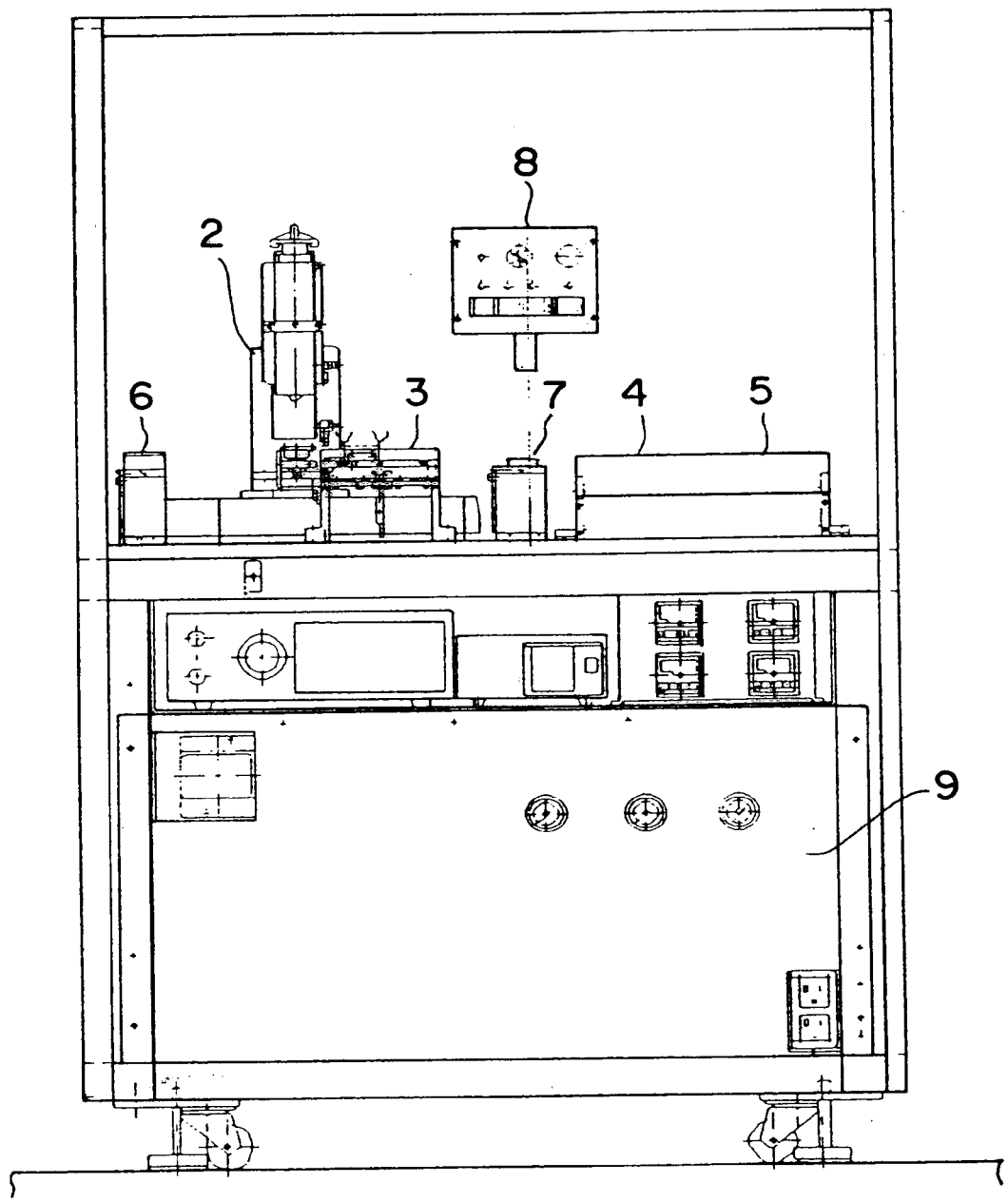
FIG. 4 is an elevational view of a dummy wafer bonding apparatus.
Figure 5:
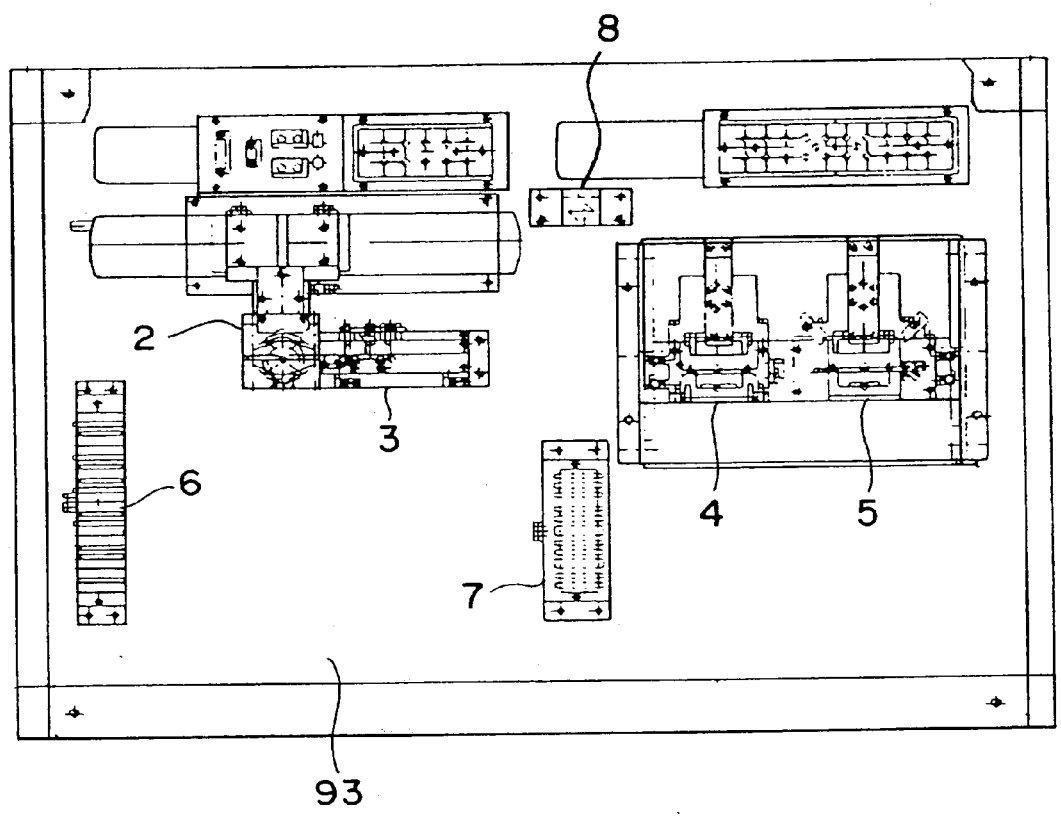
FIG. 5 is a plan view of FIG. 4.
Figure 6A:
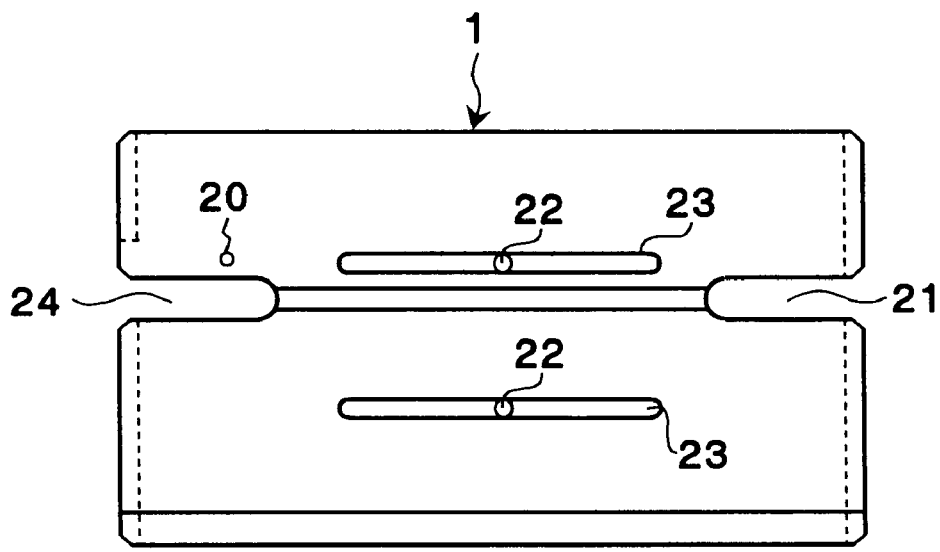
FIG. 6A is an elevational view of a dummy wafer carrier block.
Figure 6B:
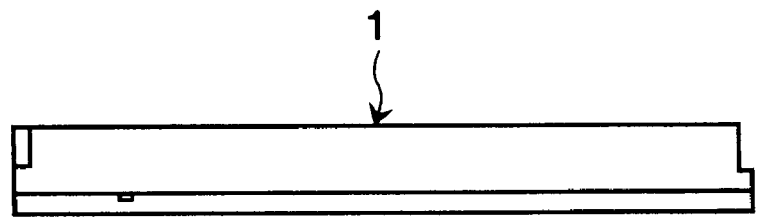
FIG. 6B is a plan view of FIG. 6A.

There will now be described bonding apparatus according to the present invention suitable for carrying out the above-mentioned bonding method with reference to FIGS. 4 to 34. FIG. 4 is an elevational view of an apparatus for bonding the dummy wafer 12 to the row block 11, and FIG. 5 is a plan view of this bonding apparatus. The dummy wafer bonding apparatus shown in FIGS. 4 and 5 includes an adhesive applying assembly 2, rail assembly 3, rinking assembly 4, bonding assembly 5, first preheating assembly 6, second preheating assembly 7, operation panel 8, and control unit 9.

Figure 7A:
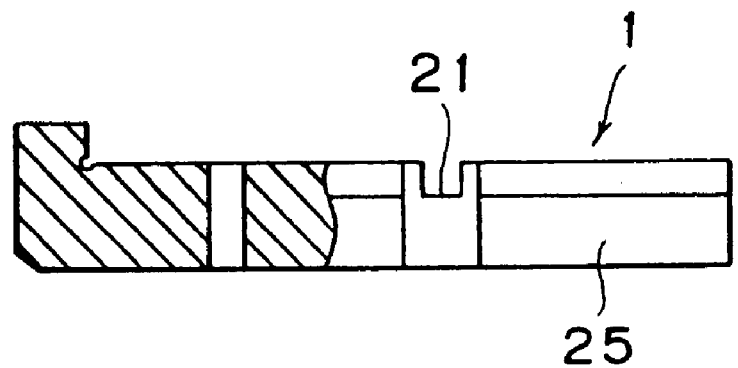
FIG. 7A is a right side view of FIG. 6A.
Figure 7B:
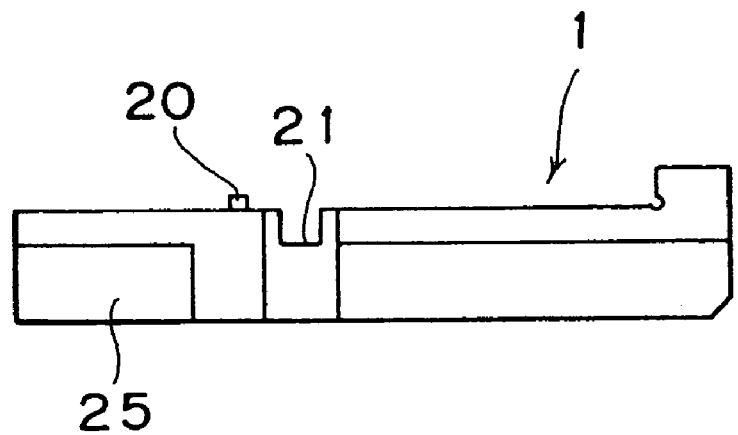
FIG. 7B is a left side view of FIG. 6A.

In a bonding operation by this bonding apparatus, a dummy wafer carrier block 1 shown in FIGS. 6A to 7B is used. The dummy wafer carrier block 1 is in L-shaped configuration as viewed in side elevation as shown in FIGS. 7A and 7B. The carrier block 1 has a pin 20 for positioning the row block 11 and a groove 21 for accepting an extra adhesive from the bonding surface between the row block 11 and the dummy wafer 12. The carrier block 1 further has a groove 24 for use in abutment of the row block 11 and the dummy wafer 12 in the bonding assembly 5, and also has a groove 25 for facilitating the carriage of the carrier block 1.

The L-shaped configuration of the carrier block 1 is intended to allow the side surface of the dummy wafer 12 opposite to the bonding surface with respect to the row block 11 to be supported by the carrier block 1. The carrier block 1 further has round holes 22 and elongated holes 23 for vacuum suction to fix the row block 11 and the dummy wafer 12. The length of each elongated hole 23 is slightly shorter than that of the row block 11 and the dummy wafer 12.

Figure 8:
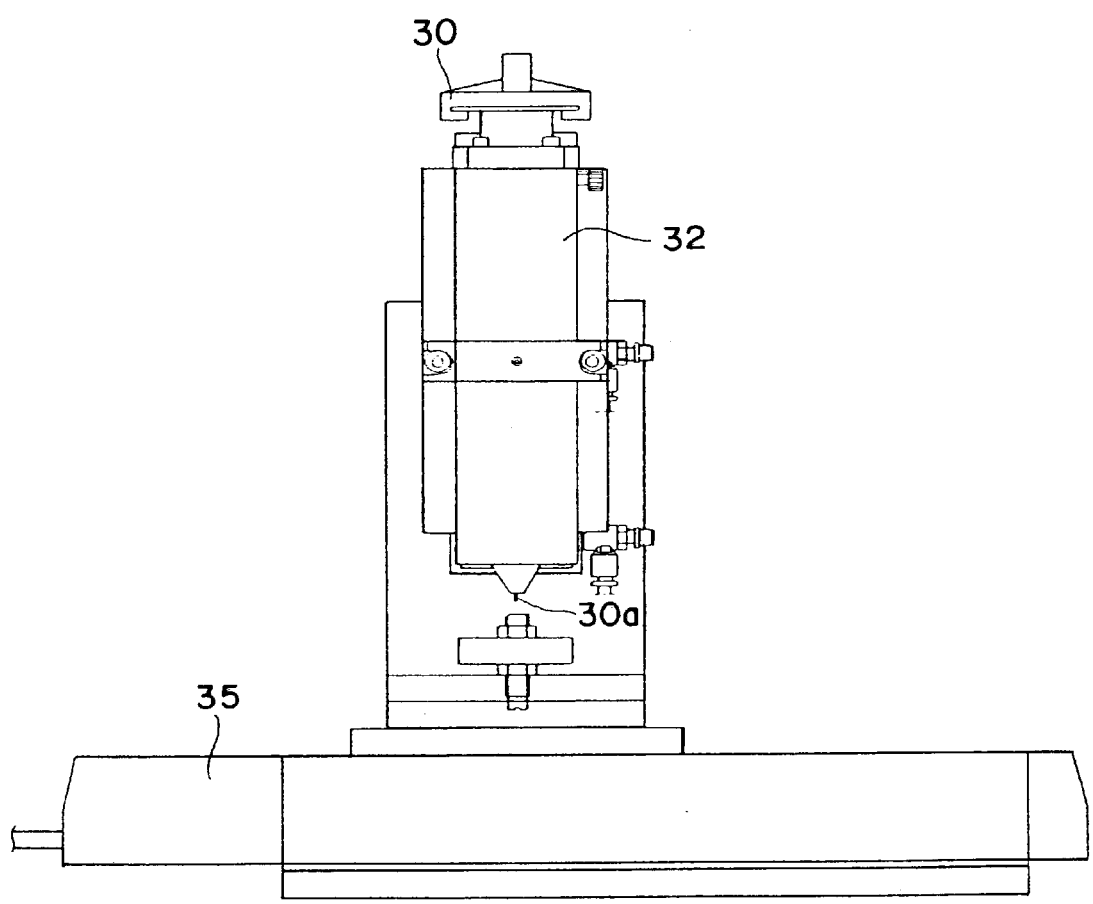
FIG. 8 is an elevational view of an adhesive applying assembly.
Figure 9:
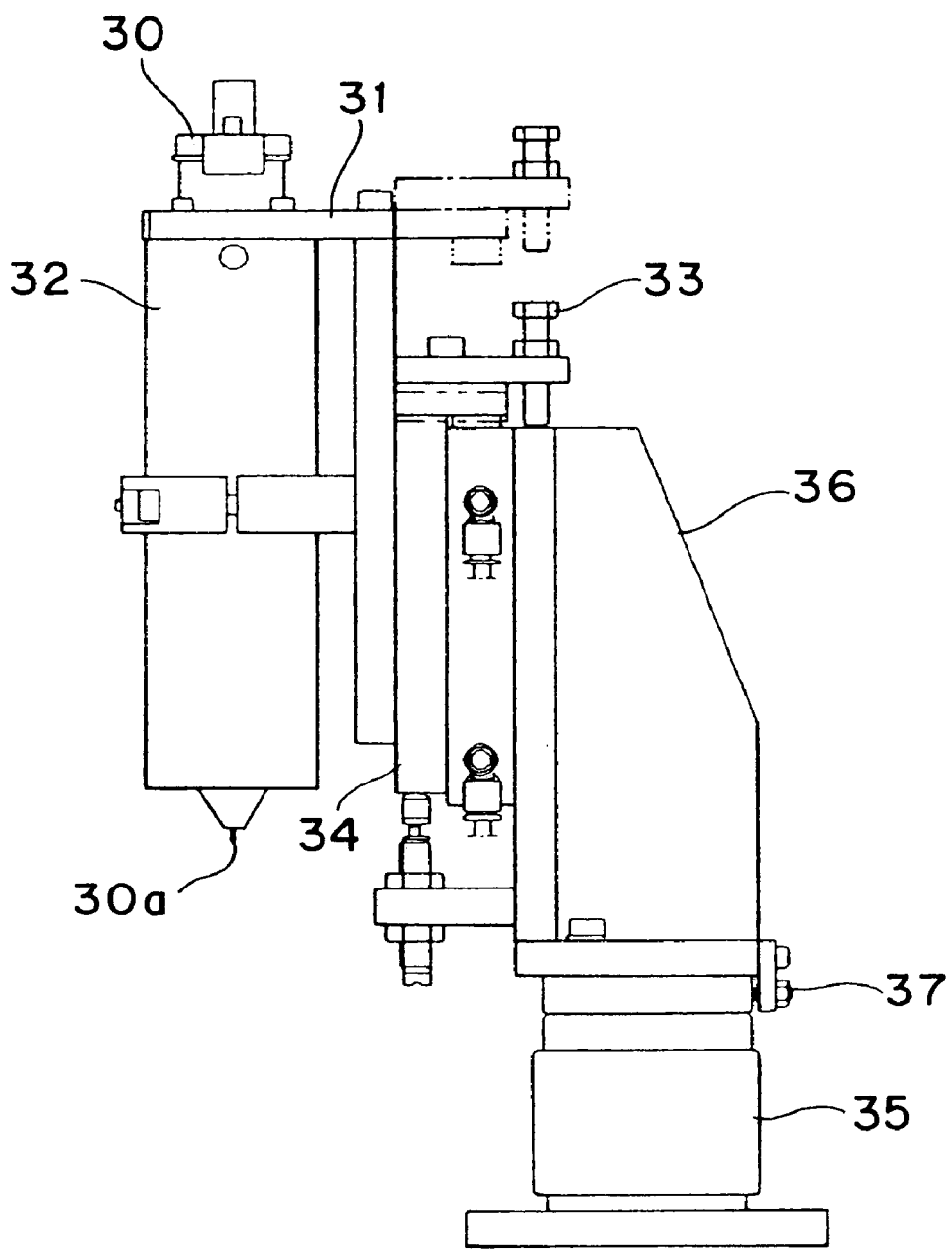
FIG. 9 is a right side view of FIG. 8.
Figure 10:
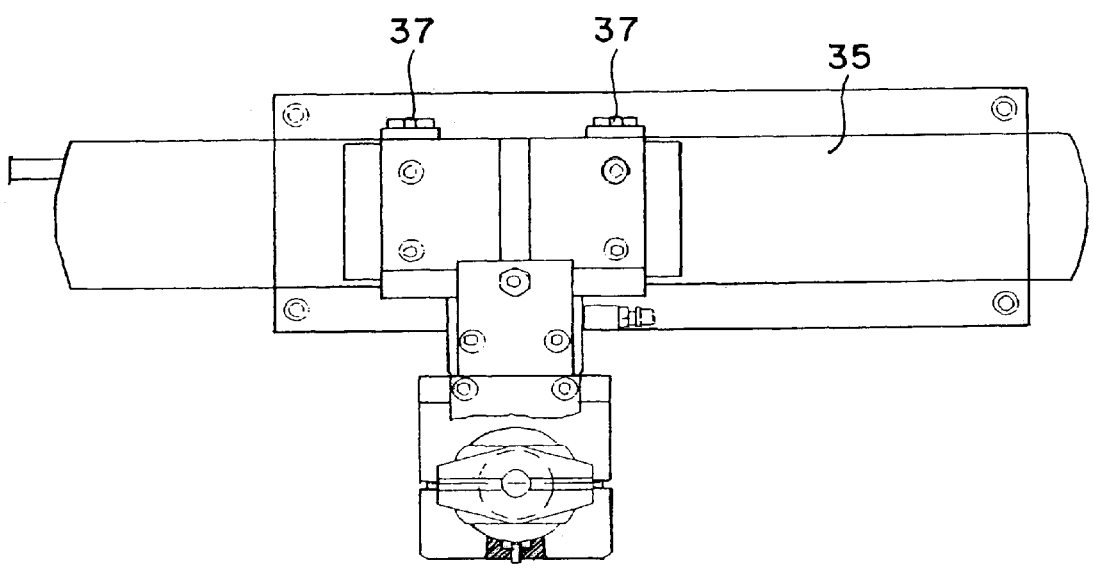
FIG. 10 is a plan view of FIG. 8.

Referring to FIG. 8, there is shown an elevational view of the adhesive applying assembly 2. FIG. 9 is a right side view of FIG. 8, and FIG. 10 is a plan view of FIG. 8. The adhesive applying assembly 2 has a syringe 30 for dispensing an adhesive in a given amount. The syringe 30 is surrounded by a temperature control block 32 for heating the syringe 30. The syringe 30 is mounted on a syringe mounting member 31. The syringe mounting member 31 is vertically movable by a cylinder 34. The cylinder 34 is mounted on a support member 36. The support member 36 is mounted on a robot 35 horizontally movable along the rail assembly 3. Further, the vertical position of a syringe tip 30a in lowering the syringe 30 by operating the cylinder 34 is finely adjustable by an adjusting screw 33.

As the adhesive, a hot-melt adhesive is used. The temperature control block 32 performs heat management of the syringe 30 so that the temperature of the syringe 30 can be arbitrarily set according to the adhesive to be used. In this preferred embodiment, the temperature of the syringe 30 is set to 140° C. The syringe mounting member 31 is formed of electrically-conductive heat-resistant plastic superior in chemical resistance. The support member 36 has two adjusting screws 37 for fine adjustment of the position of the syringe tip 30a along the depth of this assembly. That is, by rotating the adjusting screws 37, the support member 36 on the robot 35 can be adjusted in position along the depth of this assembly to effect fine adjustment of the position of the syringe tip 30a.

Figure 11:
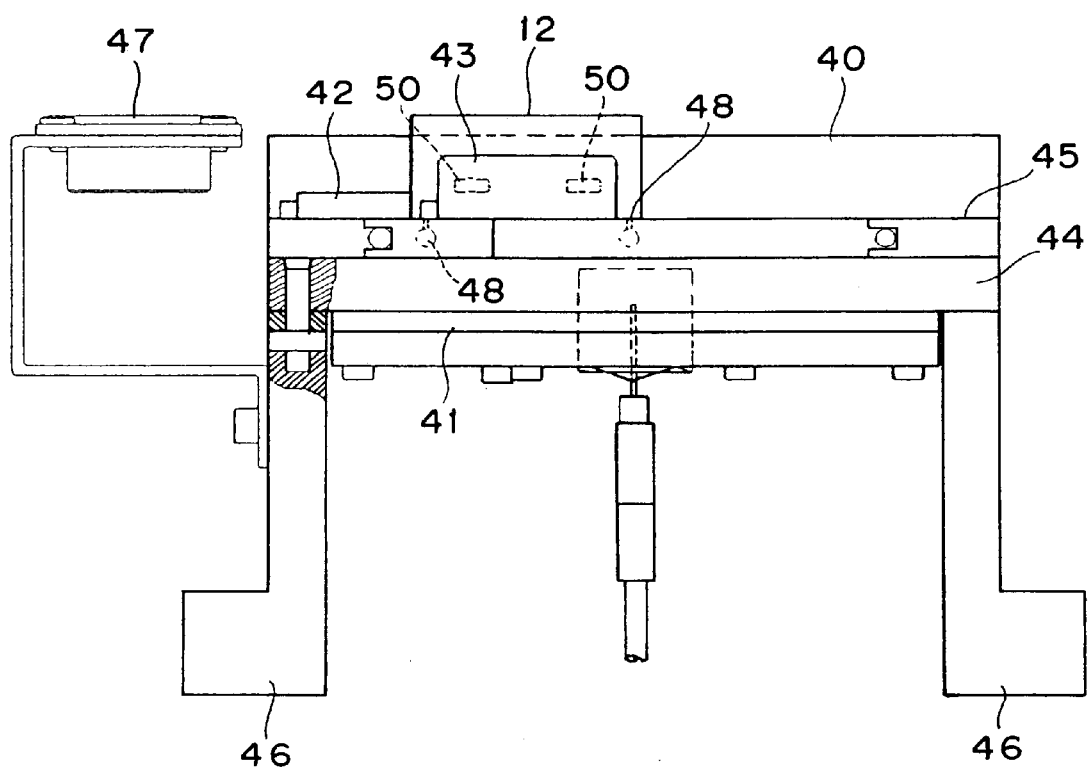
FIG. 11 is an elevational view of a rail assembly.
Figure 12:
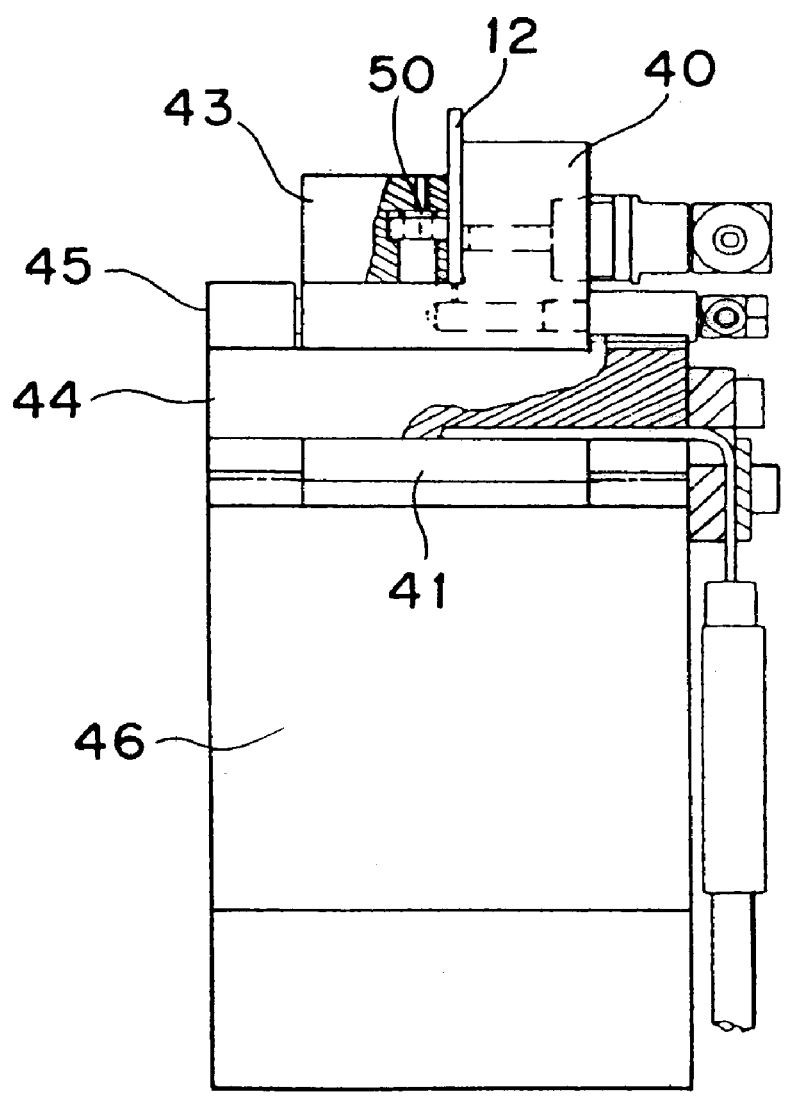
FIG. 12 is a right side view of FIG. 11.
Figure 13:
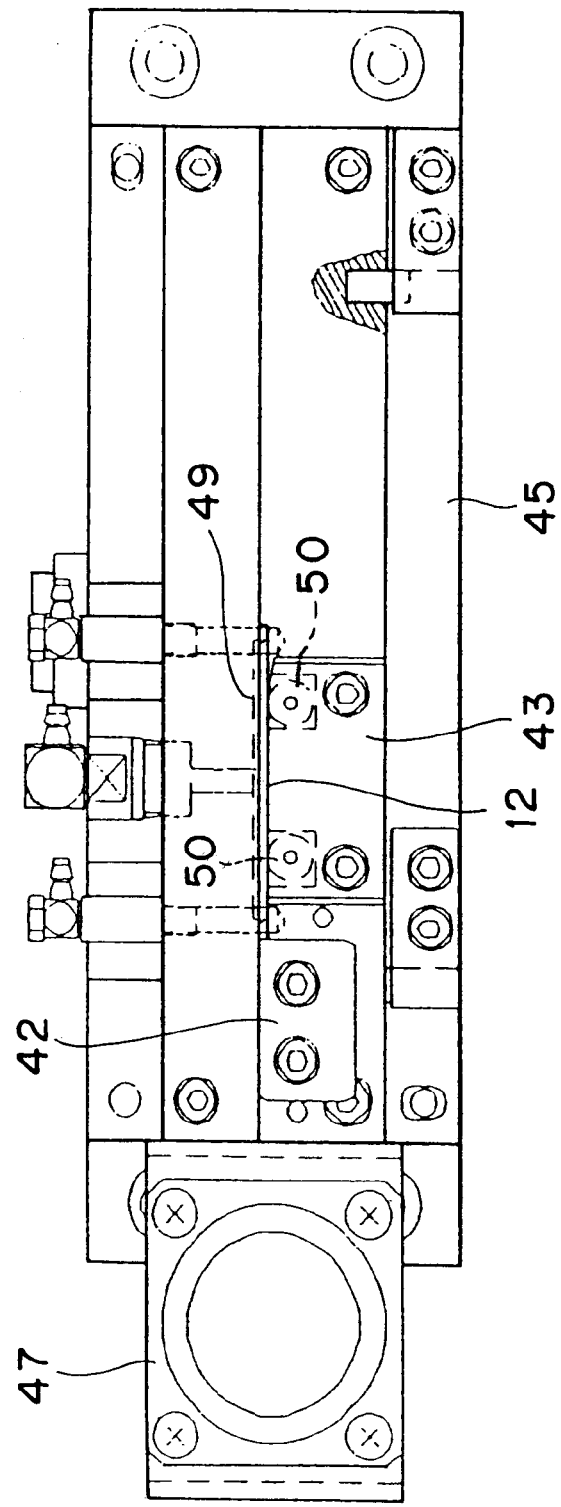
FIG. 13 is a plan view of FIG. 11.

Referring to FIG. 11, there is shown an elevational view of the rail assembly 3. FIG. 12 is a right side view of FIG. 11, and FIG. 13 is a plan view of FIG. 11. The rail assembly 3 has an L-shaped block 40 for setting the dummy wafer 12, a heater 41 for heating the L-shaped block 40, and a push block 42 for pushing one end of the dummy wafer 12 on the L-shaped block 40.

A presser block 43 is adjustably fixed on the L-shaped block 40. The presser block 43 serves both to guide the insertion of the dummy wafer 12 in pushing the dummy wafer 12 and to press the dummy wafer 12 on the L-shaped block 40. The rail assembly 3 further has a base 44 for mounting the L-shaped block 40, a positioning block 45 for positioning the L-shaped block 40, a pair of L-shaped support blocks 46 for supporting the base 44, and a pan 47 for receiving the adhesive from the syringe 30.

The L-shaped block 42 is formed with two round holes 48 for sucking a lower portion of the dummy wafer 12 and an elongated hole 49 for sucking a side surface of the dummy wafer 12. By vacuum suction of the dummy wafer 12 through these holes 48 and 49, error detection is made in the case that the dummy wafer 12 is not set in a proper position. The heater 41 performs heat management of the dummy wafer 12 set on the L-shaped block 40 so that the temperature of the dummy wafer 12 can be set to an arbitrary temperature. In this preferred embodiment, the temperature of the dummy wafer 12 is set to 100° C. The presser block 43 is provided with two bearings 50 opposed to a front surface of the dummy wafer 12, so as to smoothly insert the dummy wafer 12 between the L-shaped block 40 and the presser block 43. Accordingly, the dummy wafer 12 can be set in a given position without any damage thereto.

Figure 14:
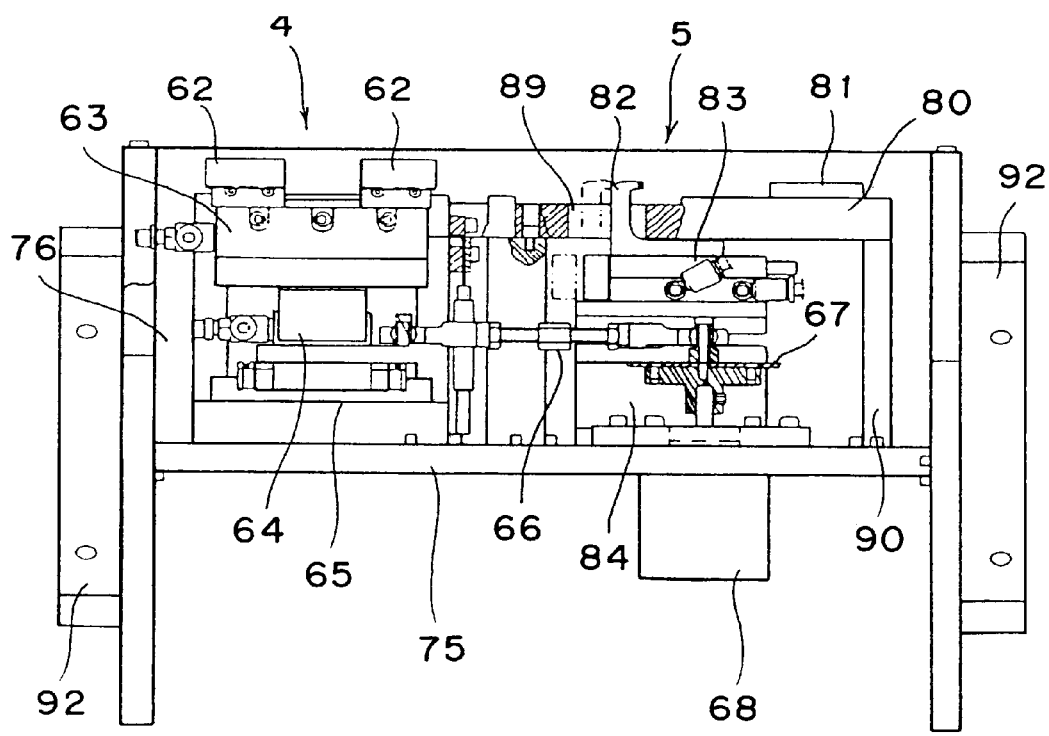
FIG. 14 is an elevational view of an integrated rinking assembly and bonding assembly.
Figure 15:
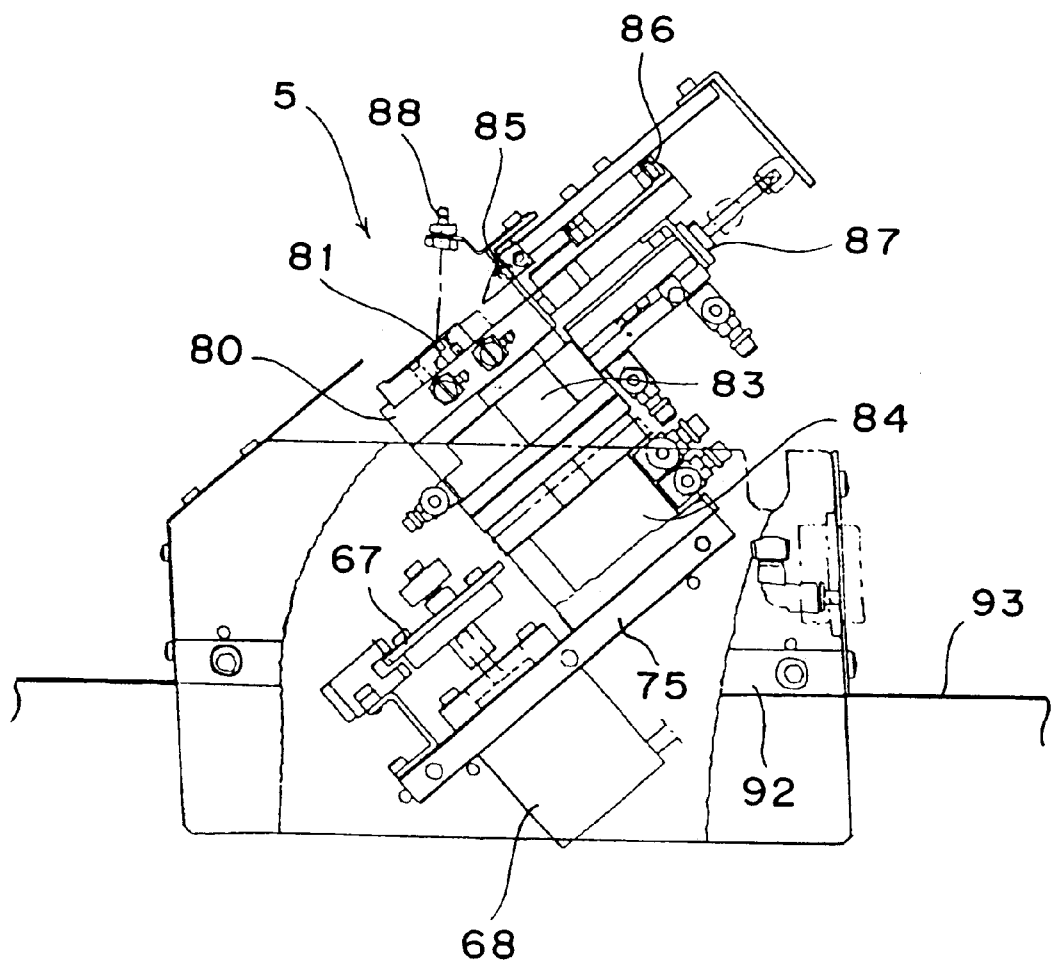
FIG. 15 is a right side view of the bonding assembly.
Figure 16:
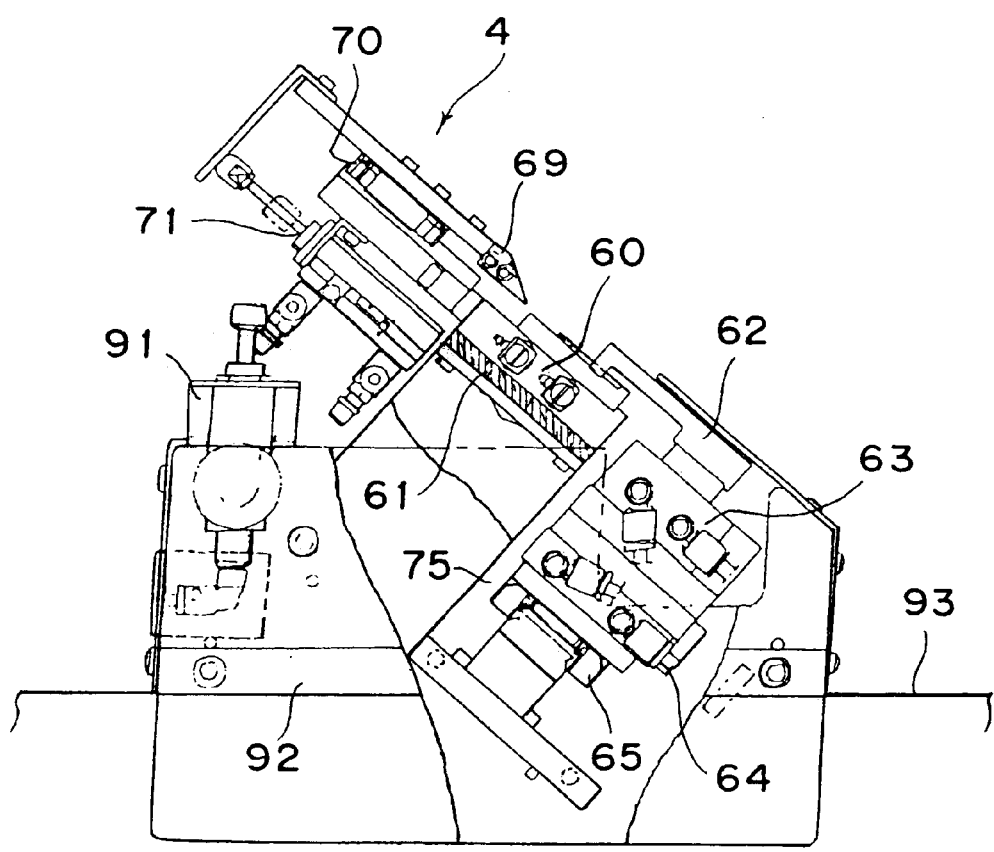
FIG. 16 is a left side view of the rinking assembly.
Figure 17:
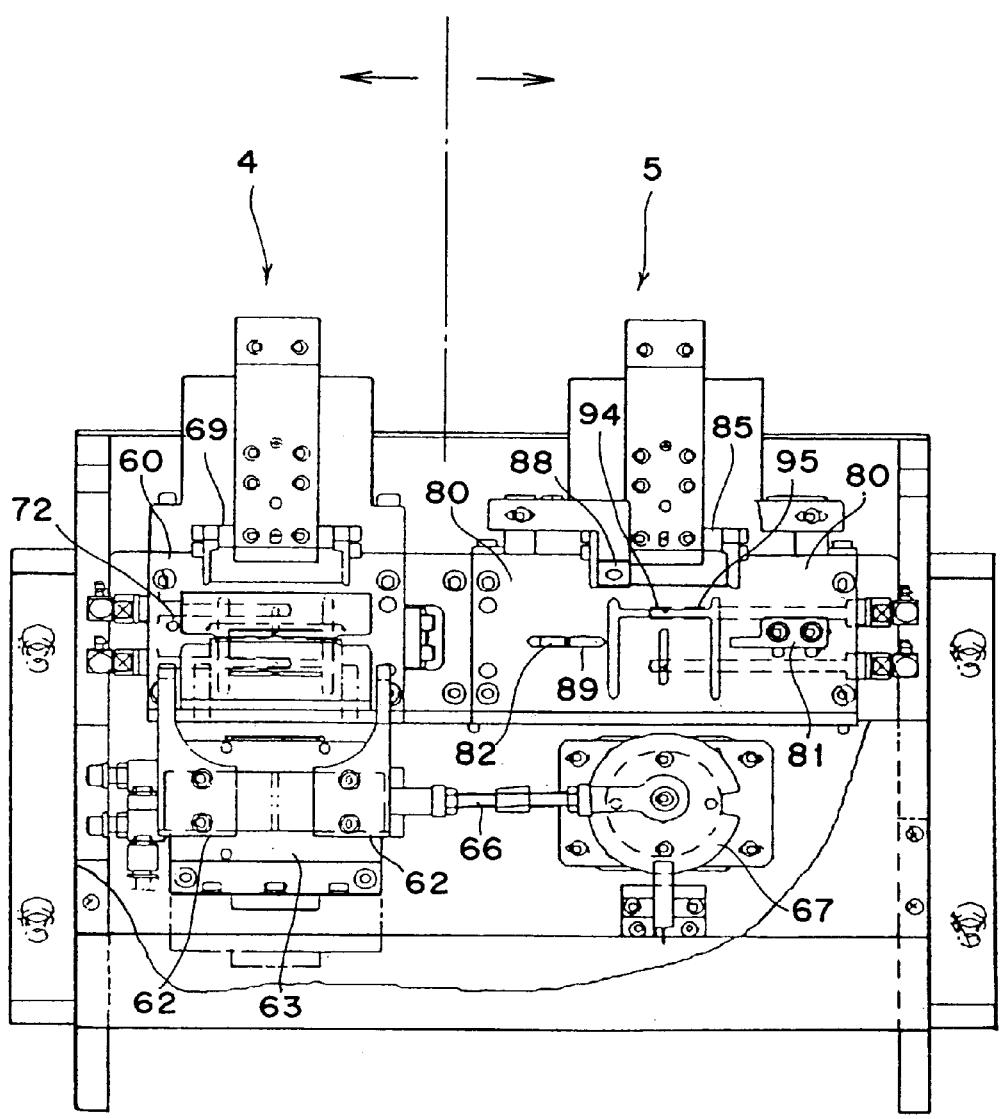
FIG. 17 is a plan view of FIG. 14.

Referring to FIG. 14, there is shown an elevational view of the rinking assembly 4 and the bonding assembly 5. FIG. 15 is an right side view of FIG. 14, FIG. 16 is a left side view of FIG. 14, and FIG. 17 is a plan view of FIG. 14. In this preferred embodiment, the rinking assembly 4 and the bonding assembly 5 are integrated together. The rinking assembly 4 has a rinking base 60 for setting the carrier block 1, a heater 61 for heating the rinking base 60, a pair of clamp blocks 62 for clamping the dummy wafer 12, a clamp cylinder 63 for operating the clamp blocks 62, and a retraction cylinder 64 for setting the clamp cylinder 63 on the rinking base 60.

The rinking assembly 4 further has a drive mechanism for reciprocating the dummy wafer 12. This drive mechanism includes a motor 68, a rinking stroke adjusting disc 67 mounted on the motor 68, a connecting rod 66 for connecting the clamp blocks 62 and the rinking stroke adjusting disc 67 and having a connecting end offset from an output shaft of the motor 68, and a linear motion guide (LM guide) 65. The rinking assembly 4 further has a pressure block 69 for pressing the row block 11, an LM guide 70, and a cylinder 71 for driving the pressure block 69.

The clamp blocks 62 are formed of electrically-conductive heat-resistant plastic. A rubber member is provided on a contact surface of the pressure block 69 coming into contact with the row block 11, so as to prevent chipping of the dummy wafer 12 and the row block 11. The rinking base 60 is provided with a pin 72 for positioning the carrier block 1. Further, although not shown, the rinking base 60 is formed with a round hole and an elongated hole for vacuum suction to fix the carrier block 1 and the row block 11.

The rinking base 60 is fixed through a heat insulating block 76 to an angled base 75. As shown in FIG. 16, the angled base 75 can be mounted on a pair of angled base mounting plates 92 at an arbitrary angle. In this preferred embodiment, this mounting angle is set to about 40°. The angled base mounting plates 92 are fixed to a common base 93. The heater 61 performs heat management of the carrier block 1 on the rinking base 60 so that the temperature of the carrier block 1 can be set to an arbitrary temperature. In this preferred embodiment, the temperature of the carrier block 1 is set to about 140° C. By changing the mounted position of the rinking stroke adjusting disc 67, the reciprocation stroke of the dummy wafer 12 can be changed.

The bonding assembly 5 has a bonding base 80 for setting the carrier block 1, a positioning block 81 for positioning the dummy wafer 12 and the row block 11, and a push block 82 for pushing the side surfaces of the dummy wafer 12 and the row block 11 opposite to the side surfaces to be positioned by the positioning block 81. The push block 82 is horizontally movable by a cylinder 83. The cylinder 83 is vertically movable by a cylinder 84. The bonding assembly 5 further has a presser block 85 for pressing the row block 11, a cylinder 87 for moving the presser block 85, and an LM guide 86 for guiding a linear motion of the presser block 85. The bonding assembly 5 is further provided with two air nozzles 88 for cooling the bonding surface between the dummy wafer 12 and the row block 11.

The push block 82 and the positioning block 81 are formed of electrically-conductive heat-resistant plastic. A rubber member is provided on a contact surface of the push block 82 with respect to the dummy wafer 12 and the row block 11, and a rubber member is also provided on a contact surface of the presser block 85 with respect to the row block 11, thereby preventing chipping of the dummy wafer 12 and the row block 11. The bonding base 80 is formed with an elongated hole 89 for vertical movement of the push block 82, and when the push block 82 is in a lowered position, the push block 82 is not projected from the upper surface of the bonding base 80.

The bonding base 80 is further formed with a round hole 94 and an elongated hole 95 for vacuum suction to fix the row block 11 and the dummy wafer 12. The bonding base 80 is mounted through a support block 90 to the angled base 75. The cylinder 83 is provided with a dedicated regulator for regulating a pushing force to be applied to the push block 82.

Figure 18:
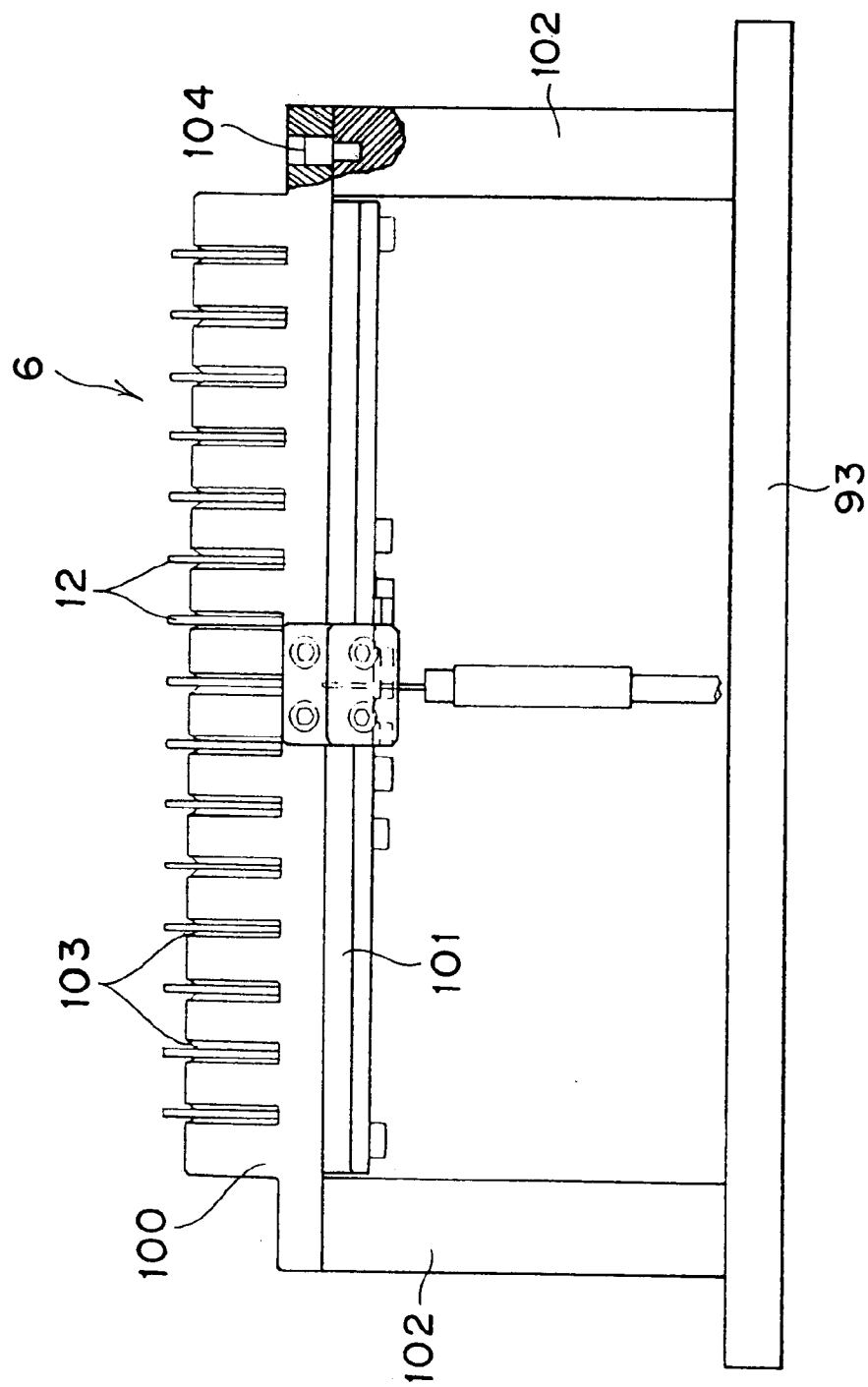
FIG. 18 is a left side view of a first preheating assembly.
Figure 19:
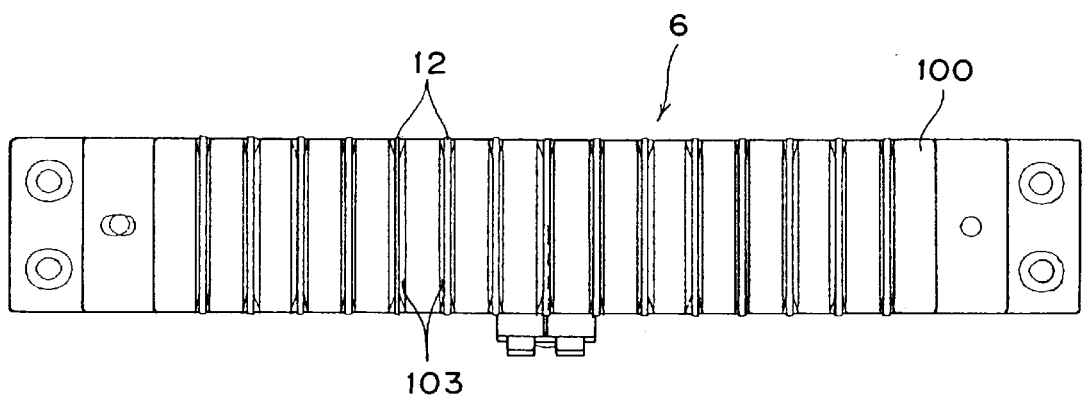
FIG. 19 is a plan view of FIG. 18.

Referring to FIG. 18, there is shown a left side view of the first preheating assembly 6. FIG. 19 is a plan view of FIG. 18. The first preheating assembly 6 has a heating block 100 having a plurality of grooves 103 for receiving a plurality of dummy wafers 12, a heater 101 for heating the heating block 100, a pair of heat insulating blocks 102 for blocking heat transfer to the common base 93.

The heating block 100 has a comb-like shape to improve the efficiency of heat conduction to the dummy wafers 12. The heater 101 performs heat management of the dummy wafers 12 inserted in the grooves 103 of the heating block 100 so that the temperature of the dummy wafers 12 can be set to an arbitrary temperature. In this preferred embodiment, the temperature of the dummy wafers 12 is set to 100° C. The heat insulating blocks 102 are formed of electrically-conductive heat-resistant plastic. Pins 104 for mounting and positioning the heating block 100 are press-fitted with the heat insulating blocks 102.

Figure 20:
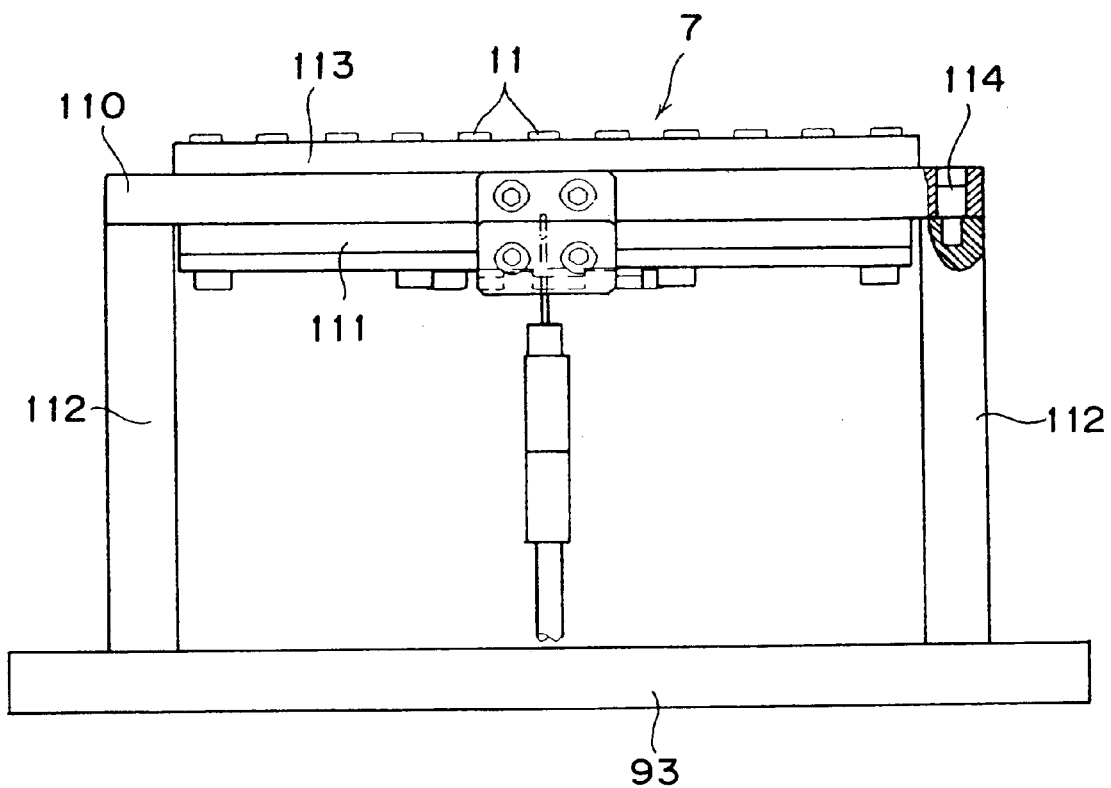
FIG. 20 is a left side view of a second preheating assembly.
Figure 21:
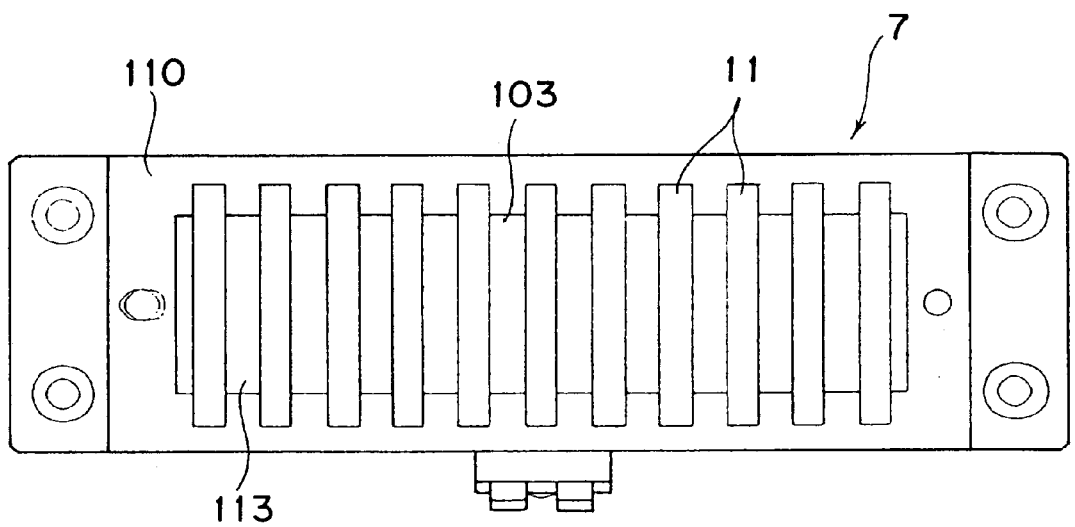
FIG. 21 is a plan view of FIG. 20.

Referring to FIG. 20, there is shown a left side view of the second preheating assembly 7. FIG. 21 is a plan view of FIG. 20. The second preheating assembly 7 has a heating block 110 for placing a plurality of row blocks 11 to heat them, a heater 111 for heating the heating block 110, and a pair of heat insulating blocks 112 for blocking heat transfer to the common base 93. The heating block 110 has a raised portion 113 having a width slightly smaller than the length of each row block 11, so as to facilitate handling of the row blocks 11.

The heater 111 performs heat management of the row blocks 11 placed on the heating block 110 so that the temperature of the row blocks 11 can be set to an arbitrary temperature. In this preferred embodiment, the temperature of the row blocks 11 is set to about 100° C. The heat insulating blocks 112 are formed of electrically-conductive heat-resistant plastic. Pins 114 for mounting and positioning the heating block 110 are press-fitted with the heat insulating blocks 112.

Figure 22:
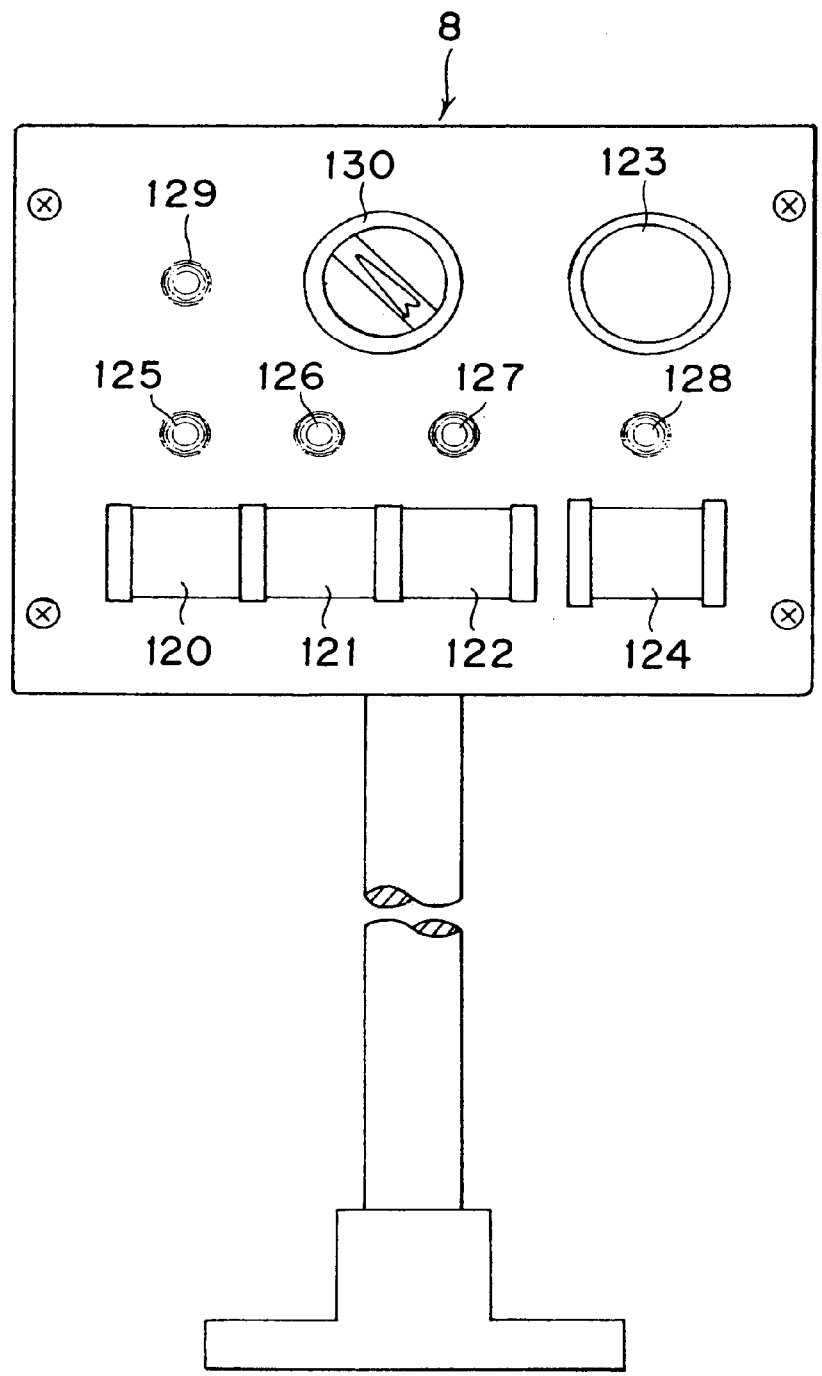
FIG. 22 is an elevational view of an operation panel.

Referring to FIG. 22, there is shown an elevational view of the operation panel 8. The operation panel 8 has a plurality of operation buttons 120, 121, and 122 respectively for the adhesive applying assembly 2, the rinking assembly 4, and the bonding assembly 5, an emergency stop button 123, and an alarm reset button 124. The operation panel 8 further has a plurality of alarm indicator lamps 125, 126, and 127 respectively corresponding to the adhesive applying assembly 2, the rinking assembly 4, and the bonding assembly 5, an alarm indicator lamp 128 for indicating any error other than that of each assembly, an operation indicator lamp 129, and a manual/auto selector switch 130.

Referring again to FIG. 4, the control unit 9 has a sequencer, syringe controller, robot controller, motor controller, solenoid valve for driving each cylinder, vacuum ejector for work vacuum, vacuum sensor, and temperature control unit for heat management of each heater.

The operation of the above-mentioned dummy wafer bonding apparatus will now be described. First, the dummy wafer 12, the row block 11, and the carrier block 1 are placed and heated on the first preheating assembly 6, the second preheating assembly 7, and the rinking assembly 4, respectively. The dummy wafer 12, the row block 11, and the carrier block 1 are heated to about 100° C. The dummy wafer 12 on the first preheating assembly 6 is moved to the rail assembly 3 in such a manner that the bonding surface of the dummy wafer 12 is oriented upward. Then, the operation button 120 for the adhesive applying assembly 2 on the operation panel 8 is depressed to start applying the adhesive to the bonding surface of the dummy wafer 12.

Figure 23:
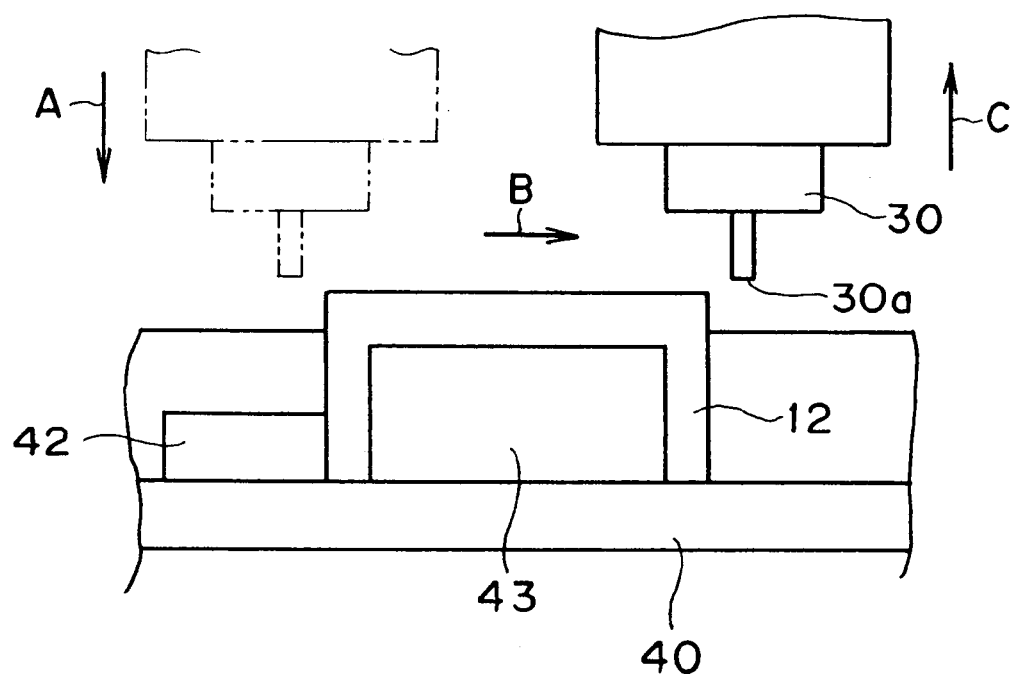
FIG. 23 is an elevational view for illustrating the operation of the adhesive applying assembly.

Whether or not the dummy wafer 12 is set in a proper position is detected by a vacuum through the round holes 48 and the elongated hole 49 of the rail assembly 3. As shown in FIG. 23, the robot 35 is moved so that the tip 30a of the syringe 30 comes to a position spaced apart by several millimeters from the left end of the bonding surface of the dummy wafer 12. As shown by an arrow A in FIG. 23, the cylinder 33 is operated to lower the syringe 30 to a position where the distance between the tip 30a of the syringe 30 and the bonding surface of the dummy wafer 12 becomes tens of micrometers.

After lowering the syringe 30 to such a given position, the robot 35 is moved along the rail assembly 3 as shown by an arrow B in FIG. 23 to move the tip 30a of the syringe 30 to a position spaced apart by several millimeters from the right end of the bonding surface of the dummy wafer 12. During this movement of the tip 30a of the syringe 30, the adhesive is applied from the tip 30a to the bonding surface of the dummy wafer 12. Thereafter, the cylinder 33 is operated to raise the syringe 30 as shown by an arrow C in FIG. 23, and the robot 35 is moved to the initial position. Thereafter, the vacuum is released. Thus, the application of the adhesive to the bonding surface of the dummy wafer 12 is completed.

After completing the application of the adhesive as mentioned above, the dummy wafer 12 is placed on the carrier block 1 set on the rinking assembly 4. Further, one of the row blocks 11 is picked up from the second preheating assembly 7, and set on the carrier block 1 in such a manner that a side surface of the row block 11 comes to abutment against the positioning pin 20 of the carrier block 1 and another side surface of the row block 11 is put on the bonding surface of the dummy wafer 12 to which the adhesive has been applied. After checking whether the left side surface of the carrier block 1 is in abutment against the positioning pin 72 of the rinking base 60, the operation button 121 for the rinking assembly 4 on the operation panel 8 is depressed to start the rinking.

First, it is detected by a vacuum whether or not the carrier block 1 is set in a proper position on the rinking base 60 and the row block 11 is set in a proper position. Then, the presser cylinder 71 is operated to lower the presser block 69 as shown by an arrow A in FIG. 24 and press the side surface of the row block 11 opposite to the bonding surface. Then, the retraction cylinder 64 is operated to raise the clamp blocks 62 to a clamp position as shown by arrows B in FIG. 24. Then, the clamp cylinder 63 is operated to move the clamp blocks 62 as shown by arrows C in FIG. 24 and clamp the dummy wafer 12.

Figure 24:
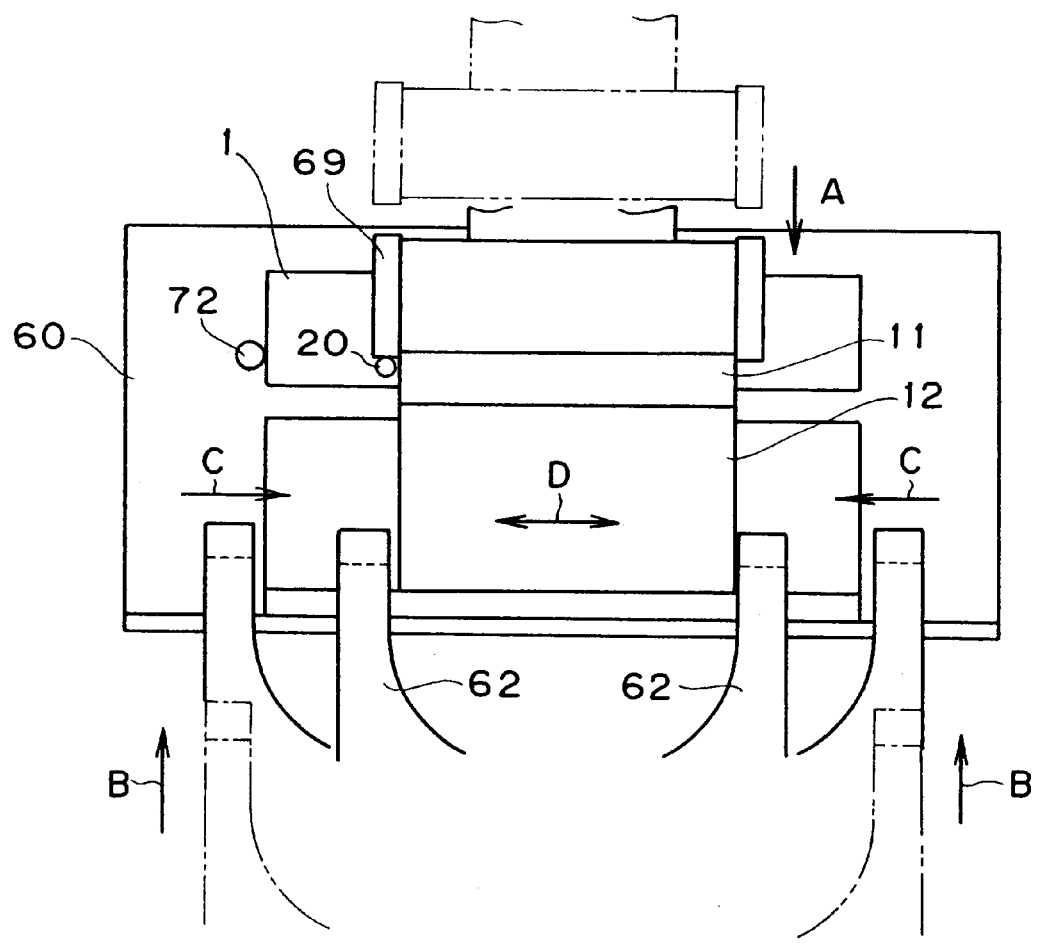
FIG. 24 is an elevational view for illustrating the operation of the rinking assembly.

Then, the motor 68 for rinking operation is operated to reciprocate the dummy wafer 12 clamped by the clamp blocks 62 relative to the row block 11 as shown by an arrow D in FIG. 24. After reciprocating the dummy wafer 12 plural times, the clamp blocks 62, the retraction cylinder 64, and the presser block 69 are returned to their initial positions, and the vacuum is released, thus completing the rinking. Thereafter, the carrier block 1 is moved to the bonding assembly 5.

Figure 25:
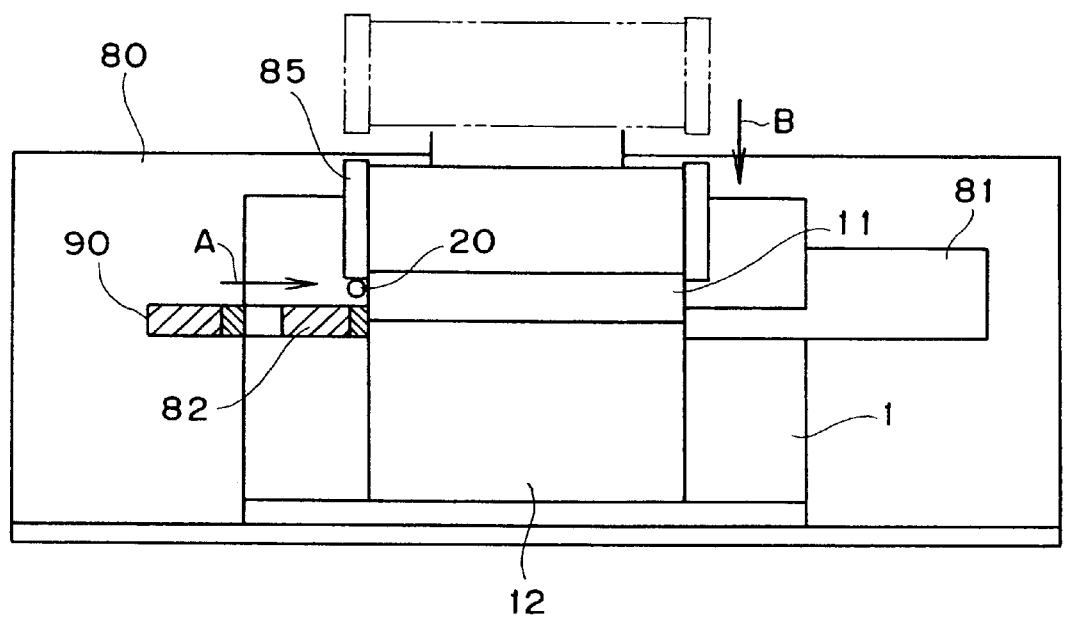
FIG. 25 is an elevational view for illustrating the operation of the bonding assembly.

In the bonding assembly 5, the carrier block 1 is brought into abutment against the positioning block 81. In this condition, the operation button 122 for the bonding assembly 5 on the operation panel 8 is depressed to start the bonding of the dummy wafer 12 and the row block 11. As in the rinking assembly 4, a vacuum is operated to raise the cylinder 84. As shown in FIG. 25, the cylinder 83 is operated to move the push block 82 until it comes to abutment against the left side surfaces of the dummy wafer 12 and the row block 11 as shown by an arrow A in FIG. 25.

Thereafter, the cylinder 87 is operated to lower the presser block 85 as shown by an arrow B in FIG. 25, thereby pressing the side surface of the row block 11 opposite to the bonding surface. During this pressing by the presser block 85, air is sprayed for several seconds from the air nozzles 88 to cool the bonding portion. After cooling the bonding portion, the cylinders 83, 84, and 87 are sequentially returned to their initial positions, and the vacuum is finally released to complete the operation of the bonding assembly 5. Thus, the row block 11 is bonded to the dummy wafer 12, thereby obtaining the integrated block 13. The integrated block 13 is then bonded to the row tool 10 by a row tool bonding apparatus shown in FIGS. 26 and 27.

Figure 26:
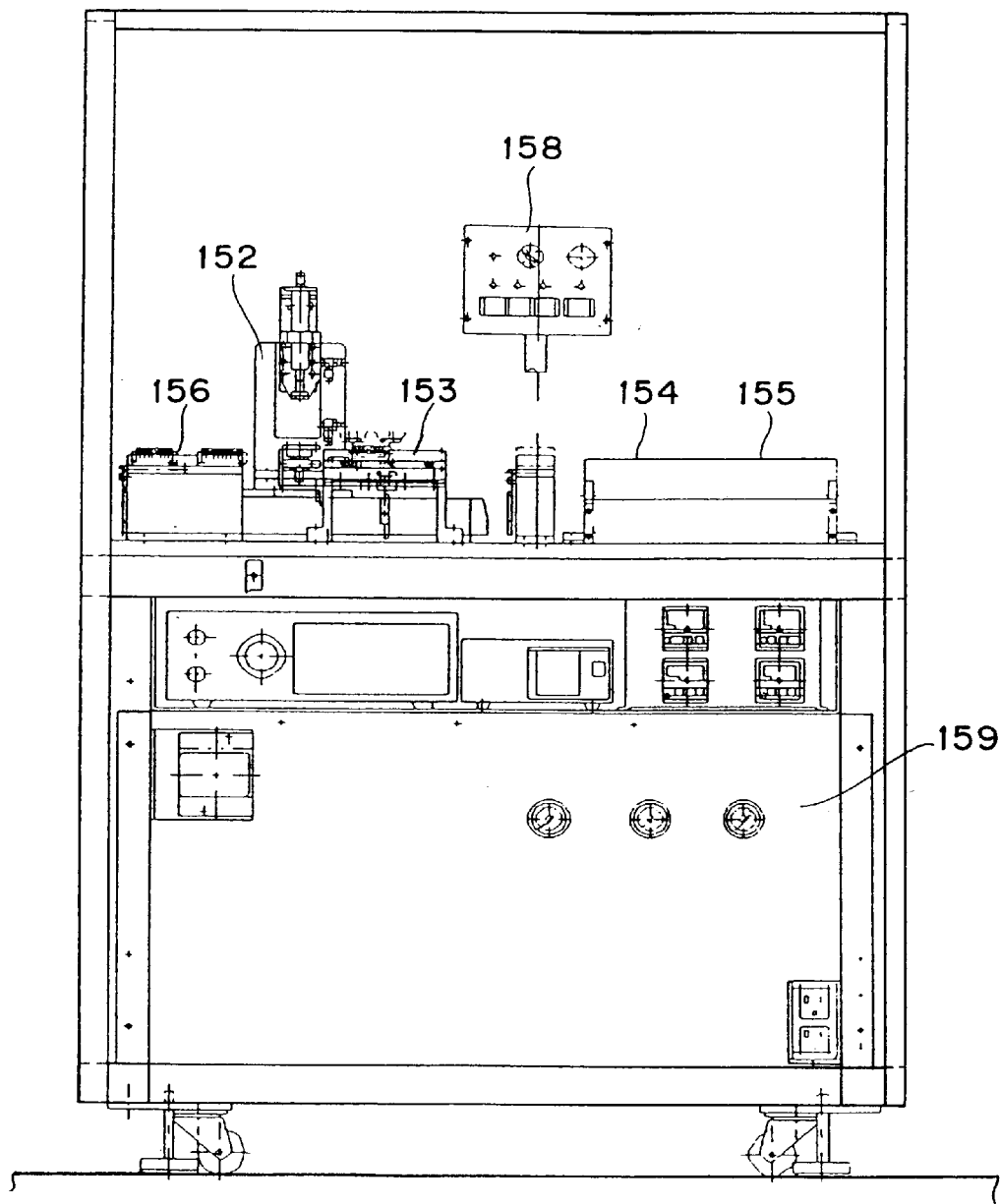
FIG. 26 is an elevational view of a row tool bonding apparatus.
Figure 27:
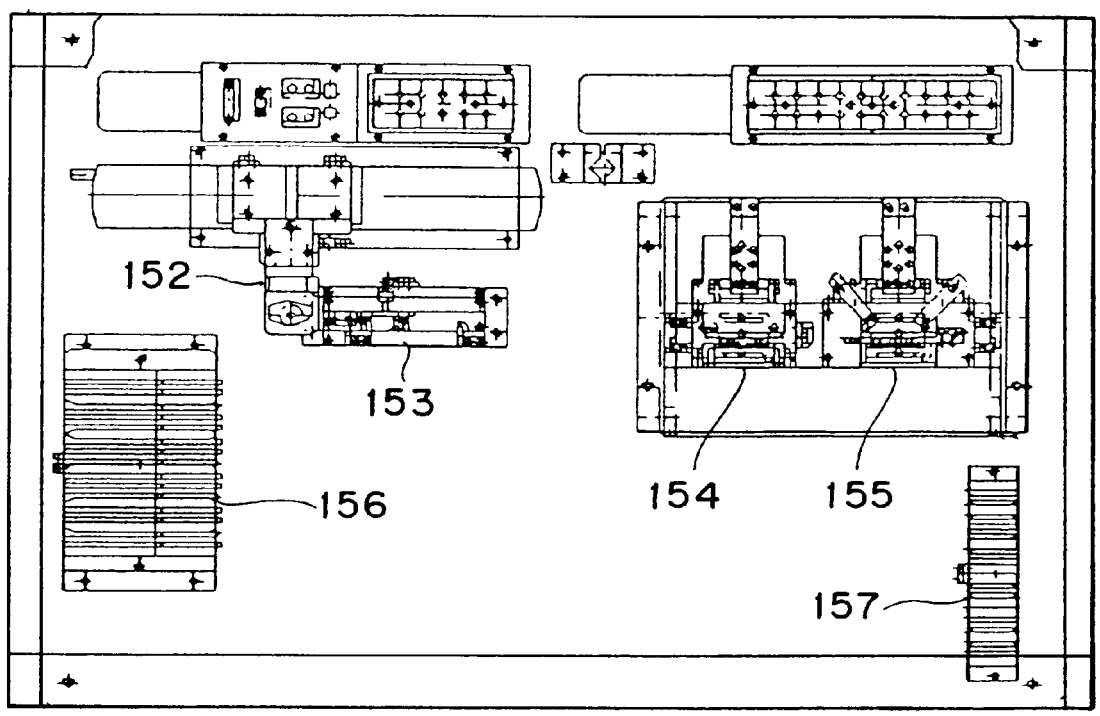
FIG. 27 is a plan view of FIG. 26.

Referring to FIG. 26, there is shown an elevational view of the row tool bonding apparatus for bonding the row tool 10 to the integrated block 13. FIG. 27 is a plan view of FIG. 26. The row tool bonding apparatus includes an adhesive applying assembly 152, rail assembly 153, rinking assembly 154, and bonding assembly 155. The row tool bonding apparatus further includes a first preheating assembly 156, second preheating assembly 157, operation panel 158, and control unit 159.

Figure 28A:
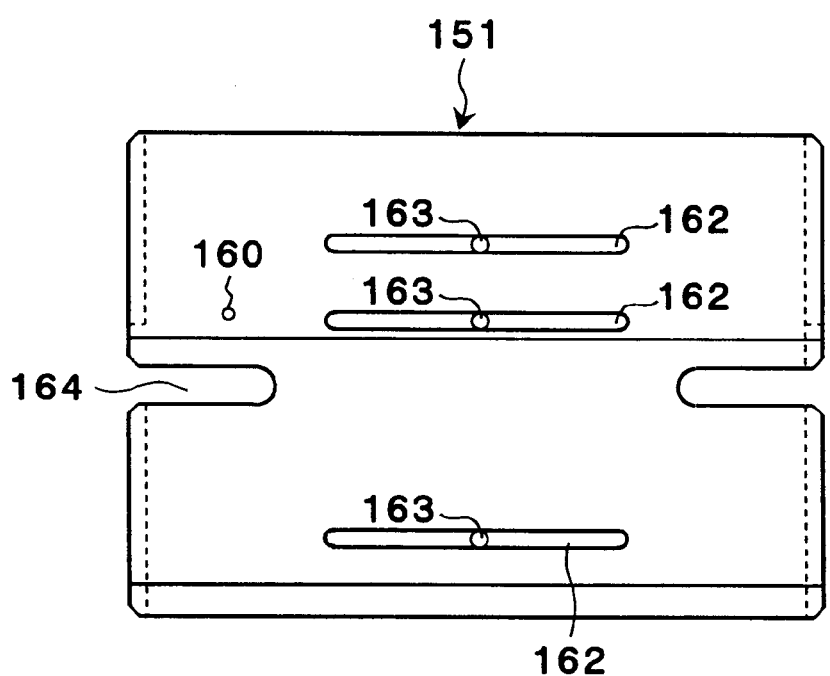
FIG. 28A is an elevational view of a row tool carrier block.
Figure 28B:
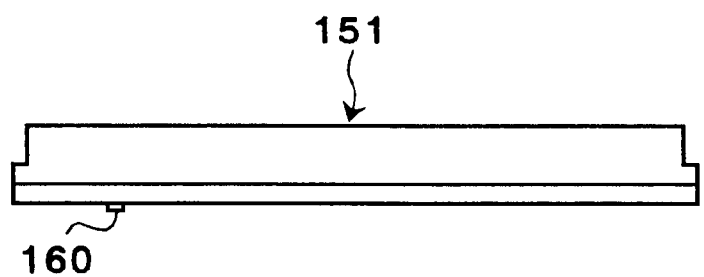
FIG. 28B is a plan view of FIG. 28A.
Figure 29A:
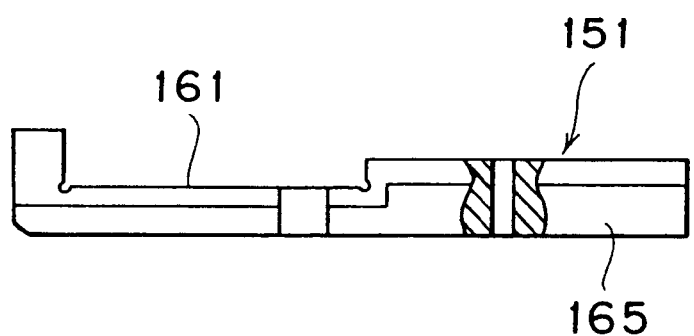
FIG. 29A is a right side view of FIG. 28A.
Figure 29B:
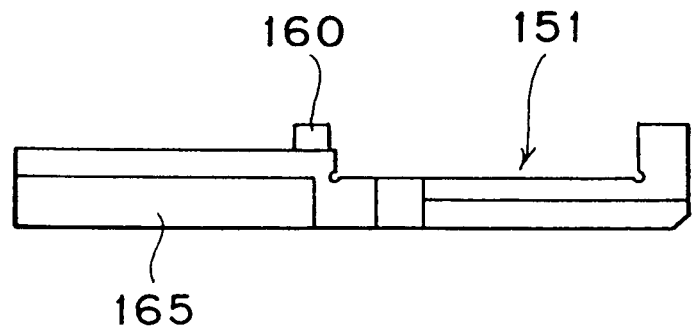
FIG. 29B is a left side view of FIG. 28A.

FIG. 28A is an elevational view of a carrier block 151 for the row tool 10, and FIG. 28B is a plan view of FIG. 28A. FIG. 29A is a right side view of FIG. 28A, and FIG. 29B is a left side view of FIG. 28A. The carrier block 151 is in L-shaped configuration as viewed in side elevation as shown in FIGS. 29A and 29B. The carrier block 151 has a pin 160 for positioning the integrated block 13, and a groove 161 for making the bonding surfaces of the row tool 10 and the integrated block 13 at the same level, because the row tool 10 and the integrated block 13 have different thicknesses.

The carrier block 151 further has a groove 164 for use in abutment of the row tool 10 and the integrated block 13 in the bonding assembly 155, and also has a groove 165 for facilitating the carriage of the carrier block 151. The L-shaped configuration of the carrier block 151 is intended to allow the row tool 10 to be easily placed on the carrier block 151. The carrier block 151 further has round holes 162 and elongated holes 163 for vacuum suction to fix the row tool 10 and the integrated block 13. The length of each elongated hole 163 is slightly shorter than that of the row tool 10 and the integrated block 13.

Figure 30:
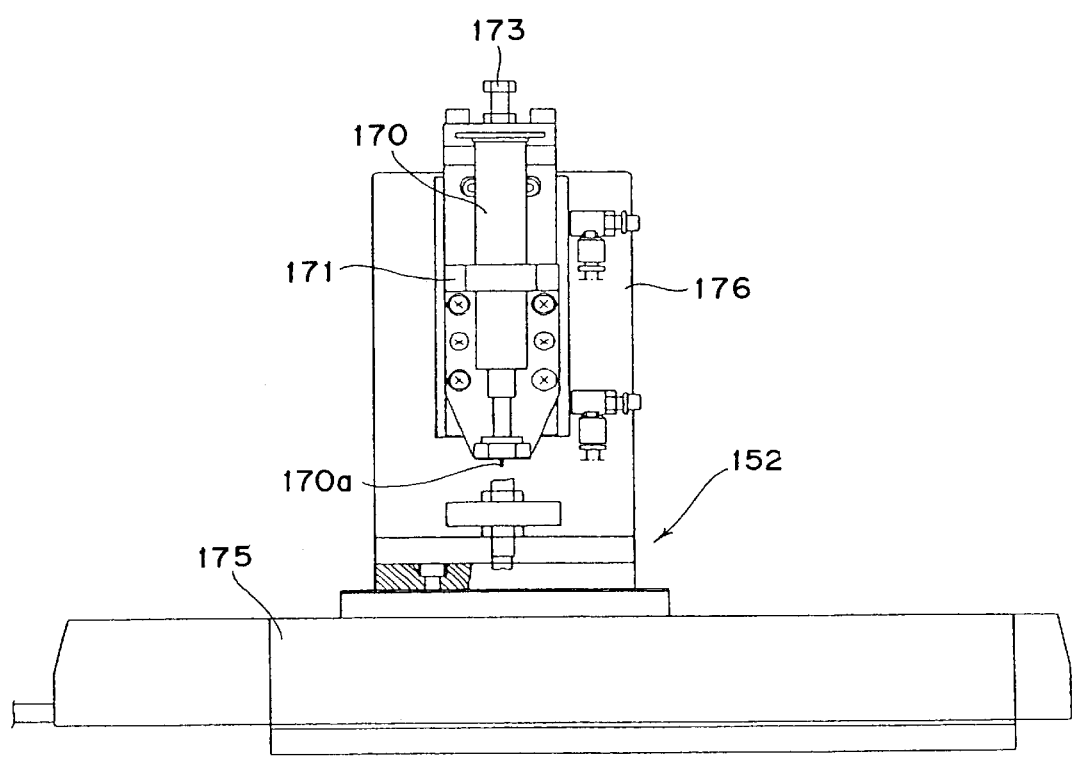
FIG. 30 is an elevational view of an adhesive applying assembly in the row tool bonding apparatus.
Figure 31:
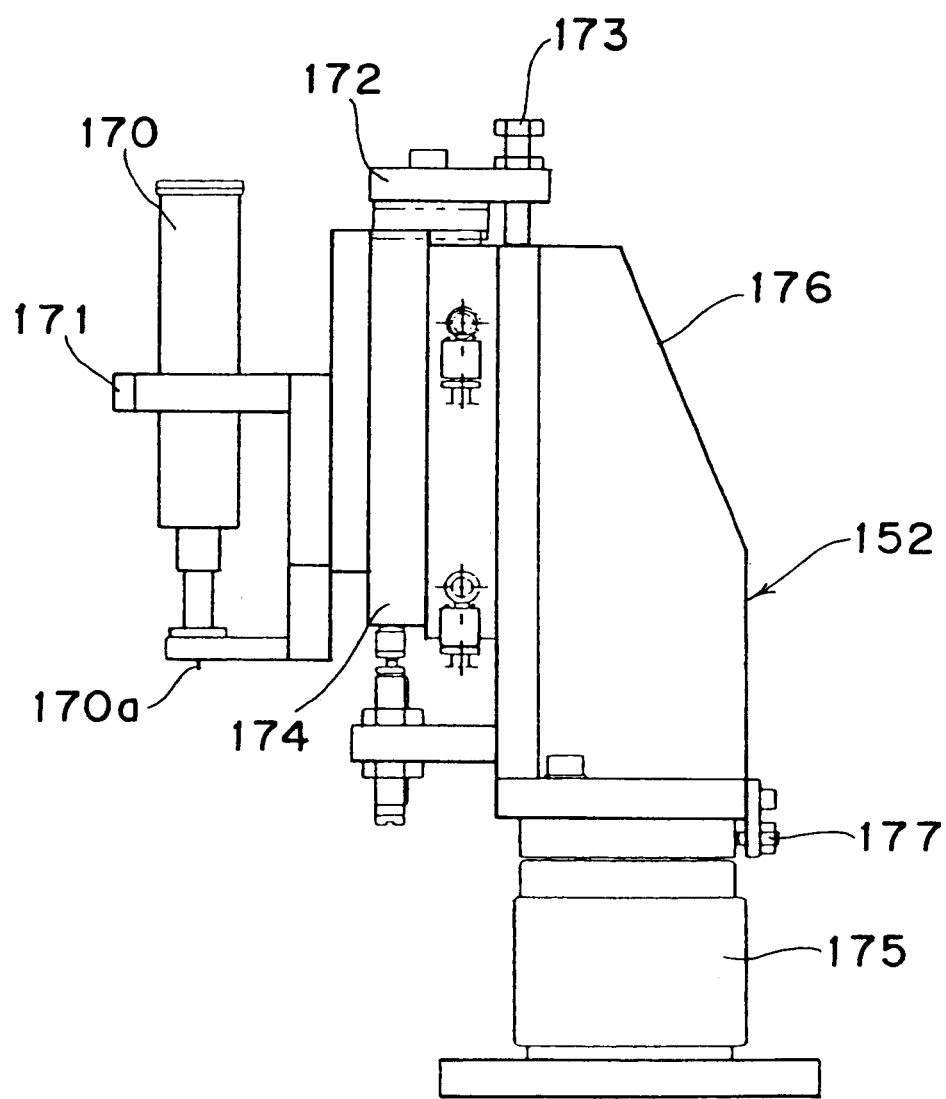
FIG. 31 is a right side view of FIG. 30.
Figure 32:
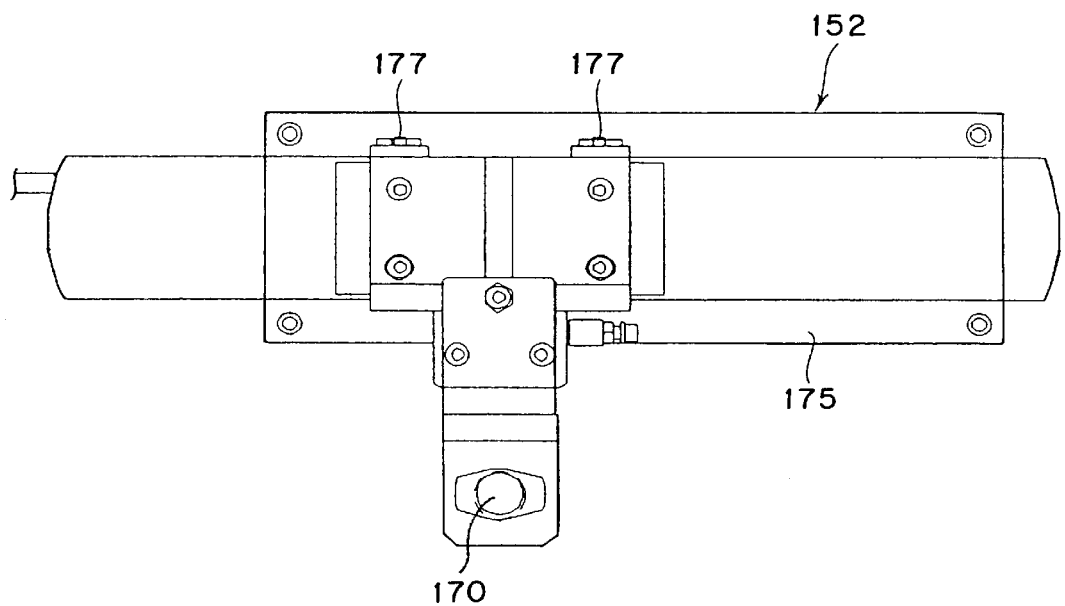
FIG. 32 is a plan view of FIG. 30.

Referring to FIG. 30, there is shown an elevational view of the adhesive applying assembly 152. FIG. 31 is a right side view of FIG. 30, and FIG. 32 is a plan view of FIG. 30. The adhesive applying assembly 152 has a syringe 170 for dispensing an adhesive in a given amount. The syringe 170 is mounted on a syringe mounting member 171. As the adhesive, a cyano-containing instantaneous adhesive is used.

The syringe mounting member 171 is vertically movble by a cylinder 174 mounted on a support member 176. The support member 176 is mounted on a robot 175 horizontally movable along the rail assembly 153. A member 172 is connected to the syringe mounting member 171, and a fine adjusting screw 173 is provided on the member 172. By rotating the fine adjusting screw 173, the vertical position of a syringe tip 170a of the syringe 170 in lowering the syringe 170 by operating the cylinder 174 can be finely adjusted.

The support member 176 is provided with two adjusting screws 177. By rotating the adjusting screws 177, the position of the syringe tip 170a along the depth of this assembly can be finely adjusted. The rail assembly 153 is similar to the rail assembly 3 mentioned above, but the size of the rail assembly 153 for supporting the row tool 10 is different from the size of the rail assembly 3 for supporting the dummy wafer 12.

The rinking assembly 154 is also similar to the rinking assembly 4 mentioned above, but the size of an elongated hole for vacuum suction of the carrier block 151 on a rinking base of the rinking assembly 154 is different from the size of the elongated hole for vacuum suction of the carrier block 1 on the rinking base 60 of the rinking assembly 4. The bonding assembly 155 is also similar to the bonding assembly 5 mentioned above except that some changes are made to support the carrier block 151. That is, the elongated hole 95 for vacuum suction on the bonding base 80, the elongated hole 89 for the push block 82 on the bonding base 80, the positioning block 81, and the cooling air nozzles 88 for the carrier block 1 are changed in size and position so as to support the carrier block 151 in the bonding assembly 154.

Figure 33:
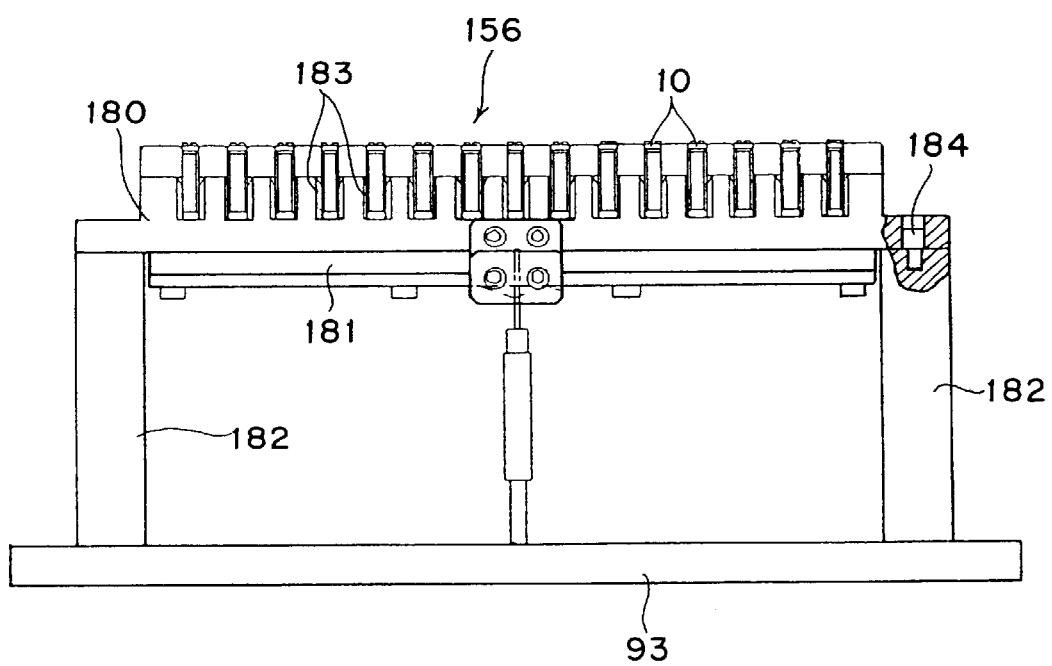
FIG. 33 is a left side view of a first preheating assembly in the row tool bonding apparatus.

Referring to FIG. 33, there is shown a left side view of the first preheating assembly 156. FIG. 34 is a plan view of FIG. 33. The first preheating assembly 156 has a heating block 180 having a plurality of grooves 183 for receiving a plurality of row tools 10, a heater 181 for heating the heating block 180, and a pair of heat insulating blocks 182 for blocking heat transfer to the common base 93.

The heating block 180 has a two-stepped upper surface to facilitate the handling of the row tools 10. The heating block 180 has a comb-like shape with the plural grooves 183 to improve the efficiency of heat conduction to the row tools 10. The heat insulating blocks 182 are formed of electrically-conductive heat-resistant plastic. Pins 184 for mounting and positioning the heating block 180 are press-fitted with the heat insulating blocks 182. The second preheating assembly 157 is similar to the first preheating assembly 6 of the dummy wafer bonding apparatus mentioned above. The operation panel 158 and the control unit 159 are also similar to the operation panel 8 and the control unit 9 of the dummy wafer bonding apparatus, respectively.

The operation of the row tool bonding apparatus is similar to the operation of the dummy wafer bonding apparatus mentioned above with the exception that the row block 11 and the dummy wafer 12 are bonded together in the dummy wafer bonding apparatus, whereas the integrated block 13 and the row tool 10 are bonded together in the row tool bonding apparatus. The workpiece, i.e., the assembly of the integrated block 13 and the row tool 10 as obtained by the dummy wafer bonding apparatus and the row tool bonding apparatus mentioned above is set on a cutting slicer, and the row block 11 is cut by the slicer to obtain the single row bar 14 bonded to the row tool 10 and separated from the integrated block 13. The remaining integrated block 13 is bonded to another row tool by using the row tool bonding apparatus to repeat similar cutting and bonding.

Figure 35:
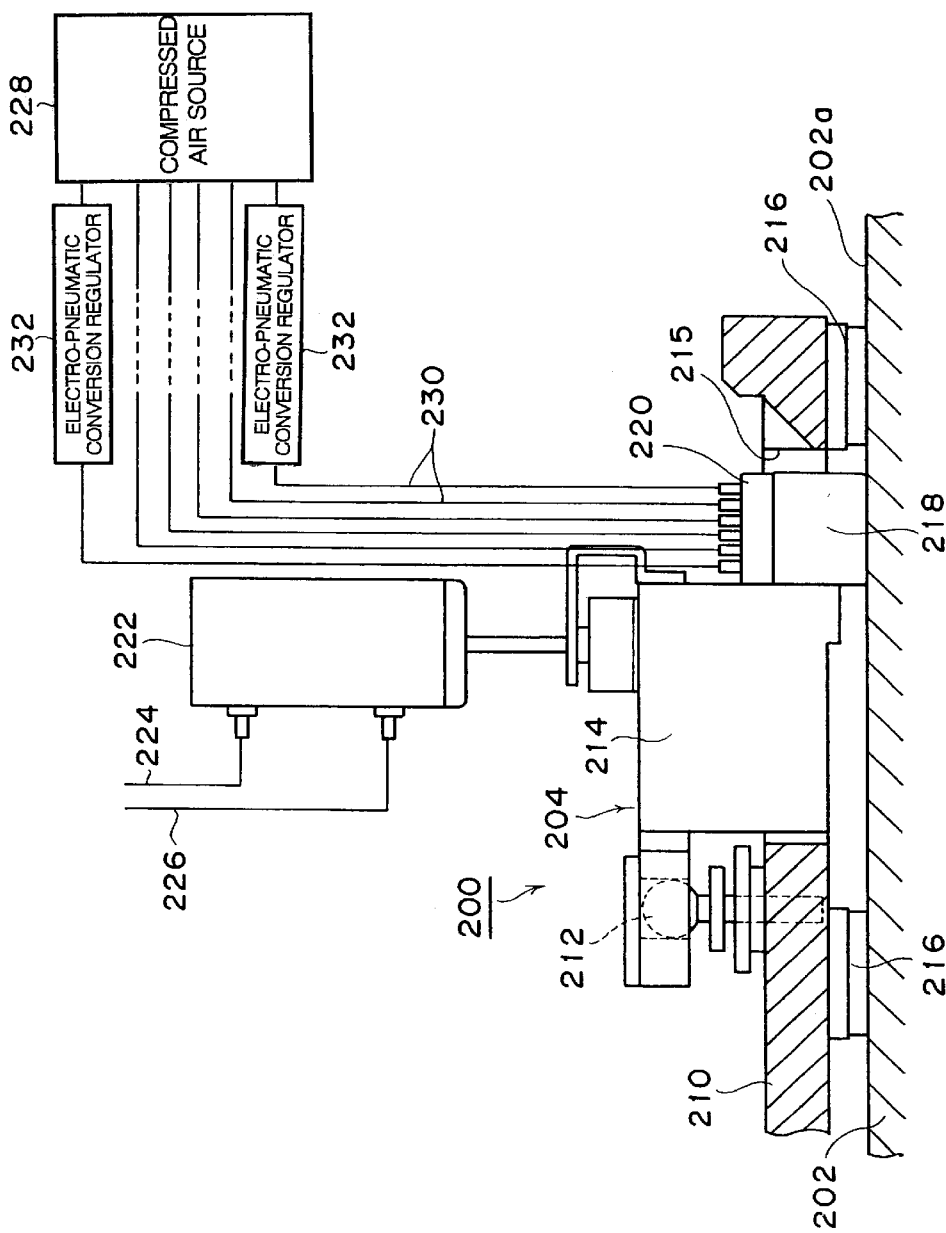
FIG. 35 is a vertical sectional view of a lapping apparatus.
Figure 36:
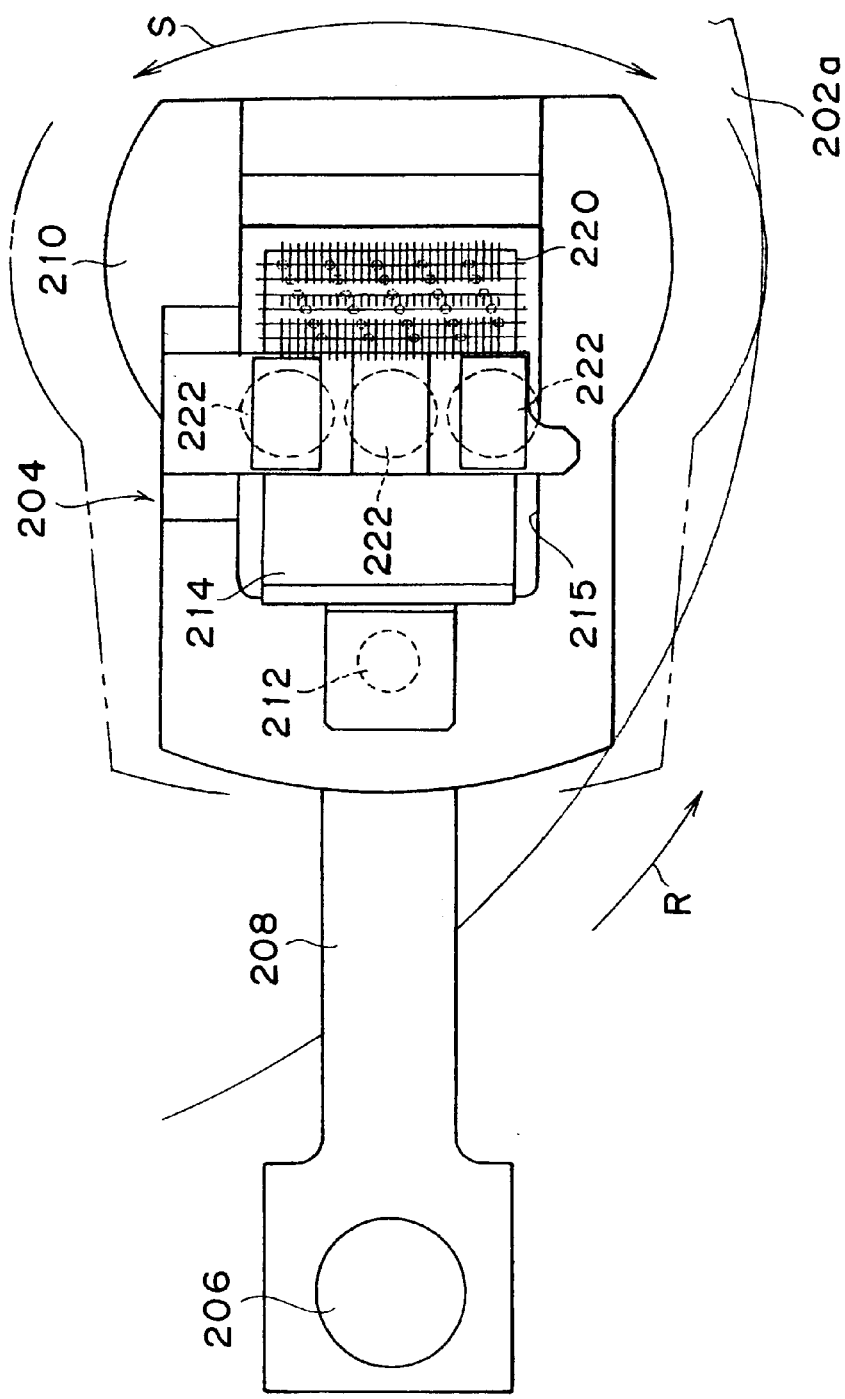
FIG. 36 is a plan view of FIG. 35.

The row bar 14 bonded to the row tool 10 is polished by using a lapping apparatus 200 described below. Referring to FIG. 35, there is shown a sectional view of the lapping apparatus 200. FIG. 36 is a plan view of the lapping apparatus 200. The lapping apparatus 200 is composed of a lap plate 202 for providing a lapping surface 202a, and a lap unit 204. The lap unit 204 includes a lap base 210 mounted through an arm 208 to a rotating shaft 206, and a lap head 214 pivotably mounted to the lap base 210 by a ball joint 212 fixed to the lap base 210.

The lap base 210 has an opening 215, and the lap head 214 is inserted in the opening 215. A plurality of (e.g., four) seats 216 are provided on the lower surface of the lap base 210, and the seats 216 slide on the lapping surface 202a. A row tool 218 is fixed to the lap head 214 by screws, for example. An air plate 220 is fixed to the upper surface of the row tool 218. Three pneumatic cylinders 222 for applying air pressure to the lap head 214 are provided above the lap head 214.

Each pneumatic cylinder 222 is connected through tubes 224 and 226 to an electro-pneumatic conversion regulator (not shown) and a compressed air source 228. The air plate 220 is formed with a plurality of rectangular holes to be hereinafter described, and each rectangular hole is connected through an air tube 230 to an electro-pneumatic conversion regulator 232. Each electro-pneumatic conversion regulator 232 is connected to the compressed air source 228.

In lapping the row bar 14 bonded to the row tool 218, the lap plate 202 is rotated in a direction of arrow A in FIG. 36 by a motor (not shown), and the lap unit 204 is swung about the rotating shaft 206 in a direction of arrow S in FIG. 36 by a drive mechanism (not shown). The lap plate 202 is rotated at about 50 rpm during rough lapping, and rotated at about 15 rpm during finish lapping. On the other hand, the lap unit 204 is swung about 10 times per minute both during rough lapping and during finish lapping.

Figure 37:
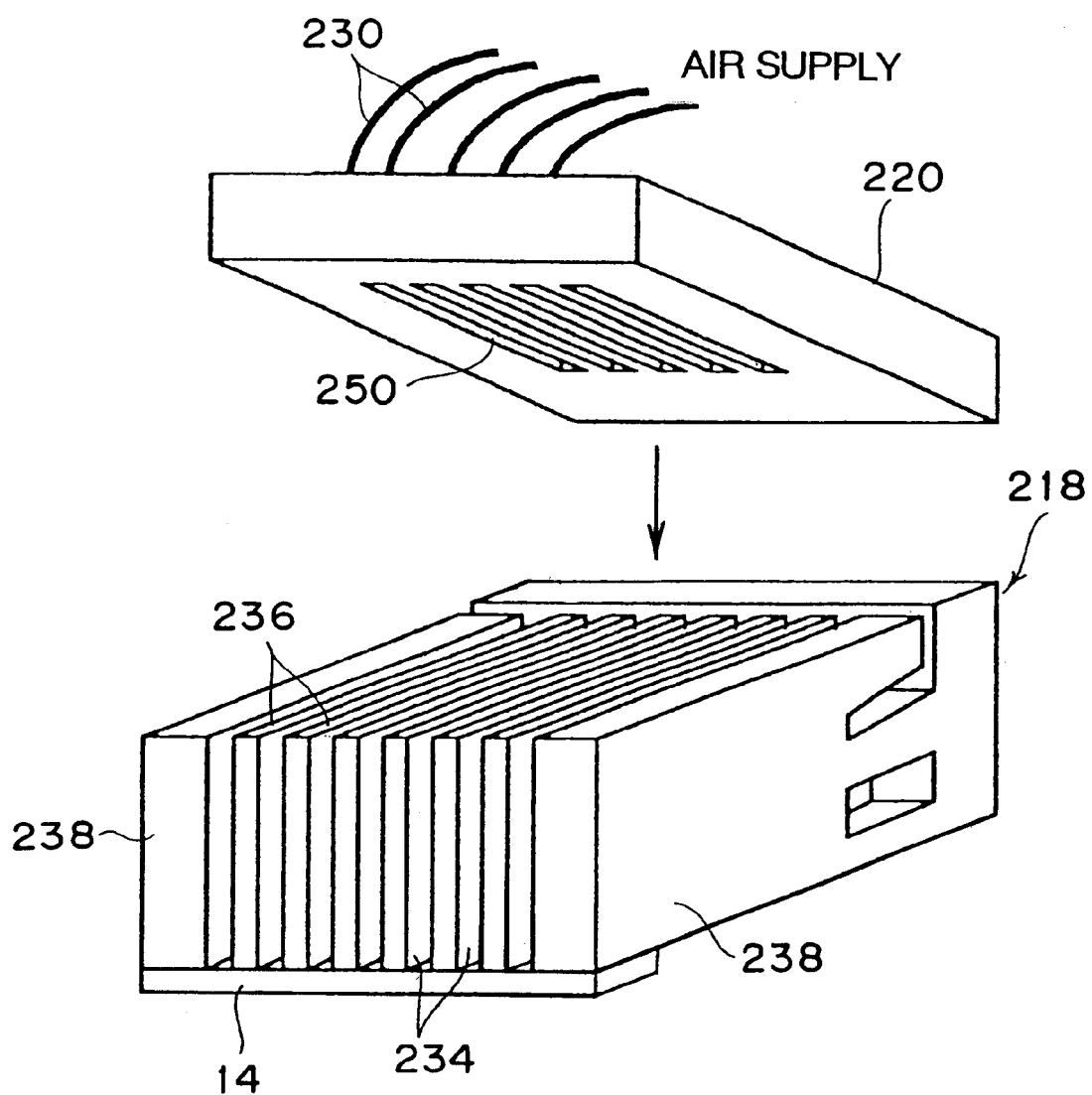
FIG. 37 is an exploded perspective view of a row tool and an air plate in the lapping apparatus.
Figure 38:
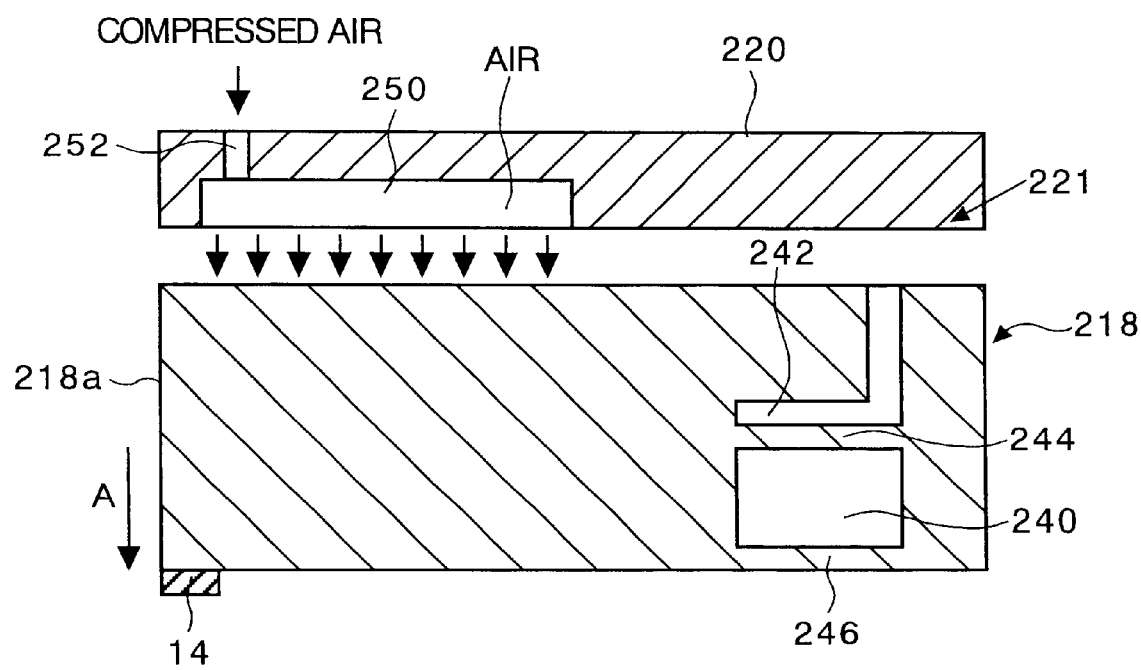
FIG. 38 is an exploded sectional view of the row tool and the air plate shown in FIG. 37.

Referring to FIG. 37, there is shown an exploded perspective view of the row tool 218 and the air plate 220 fixed to the row tool 218. FIG. 38 is an exploded sectional view of the row tool 218 and the air plate 220. The air plate 220 is fixed by screws to the row tool 218 in the vicinity of a portion shown by an arrow 221 in FIG. 38. The row tool 218 and the air plate 220 are formed of stainless steel, for example. The row tool 218 has a plurality of rectangular bend cells 236 formed by a plurality of vertical slits 234 and extending in a longitudinal direction, and a pair of fixed cells 238 formed on the opposite sides of the bend cells 236. Each of the fixed cells 238 has a width larger than that of each bend cell 236.

As best shown in FIG. 38, the row tool 218 is formed with a rectangular hole 240 and an L-shaped hole or slit 242, thereby forming two thin-walled portions 244 and 246. These thin-walled portions 244 and 246 are parallel to each other and have the same wall thickness, thereby forming a parallel spring mechanism. The air plate 220 is formed with a plurality of rectangular holes 250 respectively corresponding to the plural bend cells 236 of the row tool 218. Each rectangular hole 250 is connected through a hole 252 to the corresponding air tube 230. The upper surface of the row tool 218 and the lower surface of the air plate 220 are polished so as to have a flatness of 3 µm or less.

The row bar 14 to be lapped is bonded to a front end portion of the lower surface of the row tool 218. The row bar 14 is formed with a plurality of magnetic head elements and an electrical lapping guide element (ELG element) as a lap monitoring resistance element. In lapping the row bar 14, a relay printed circuit board is mounted on a front end surface 218a of the row tool 218, and pads of the relay printed circuit board and terminals of the ELG element are connected together by wire bonding, so as to measure a change in resistance of the ELG element.

The pressure in lapping the row bar 14 bonded to the row tool 218 is determined by the self-weight of the lap head 214 shown in FIG. 35 and the pressure applied to the lap head 214 by the pneumatic cylinders 222 shown in FIG. 35. This pressure is set high during the rough lapping and set low during the finish lapping. Fine adjustment of this pressure is achieved by a thrust applied to each bend cell 236 of the row tool 218. That is, a pneumatic pressure regulated by each electro-pneumatic conversion regulator 232 is supplied to the air plate 220 to fill the corresponding rectangular hole 250 shown in FIG. 38 and thereby generate a thrust expressed below.

Thrust $F$ (N)=Pressure $P$ (Mpa)×Area $S$ (m$^2$)

Accordingly, the upper surface of each bend cell 236 of the row tool 218 is pushed by this thrust. Since the row tool 218 has a parallel spring mechanism as mentioned above, the row tool 218 is slightly displaced in a direction of arrow A in FIG. 38 at a portion near the row bar 14.

The displacement of the row tool 218 is dependent on the air pressure supplied, so that local deformation of the row bar 14 can be corrected to allow straight lapping by applying the air pressure regulated by each electro-pneumatic conversion regulator 232 corresponding to each bend cell 236. When the air pressure is supplied to the air plate 220, the row tool 218 and the air plate 220 may be separated from each other, so that the air plate 220 is fixed by two screws to the row tool 218 at a portion shown by the arrow 221 as mentioned above.

Although the air supplied leaks slightly from between the air plate 220 and the row tool 218, the contact surfaces of the air plate 220 and the row tool 218 are polished so as to have a flatness of 2 µm or less, thereby obtaining a substantially linear relation between the supplied air pressure and the displacement of each bend cell 236. If the air leakage is large, the absolute displacement of each bend cell 236 becomes small and the hysteresis is also large. Therefore, the air leakage must be minimized.

Figure 39:
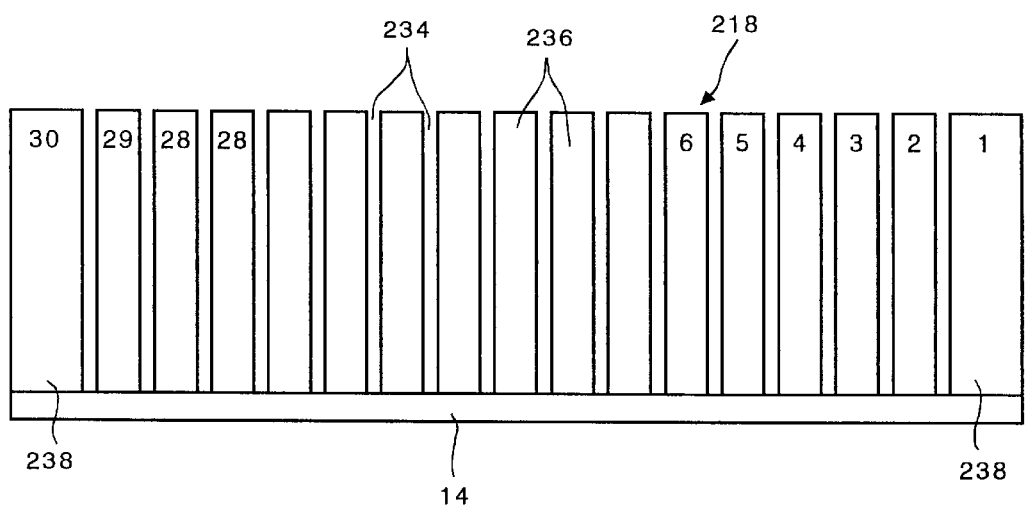
FIG. 39 is an elevational view of the row tool.
Figure 40A:
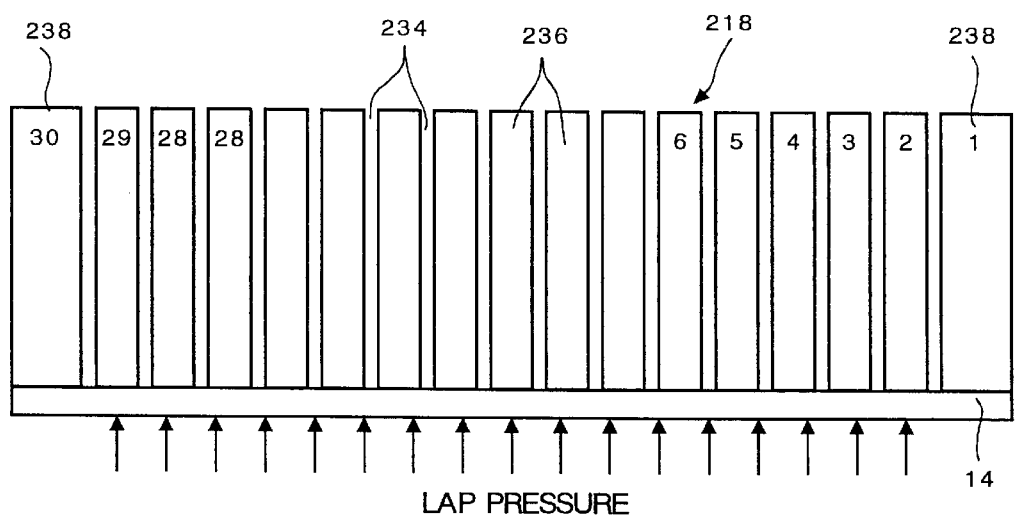
FIGS. 40A and 40B are elevational views for illustrating the influence of a lap pressure.
Figure 40B:
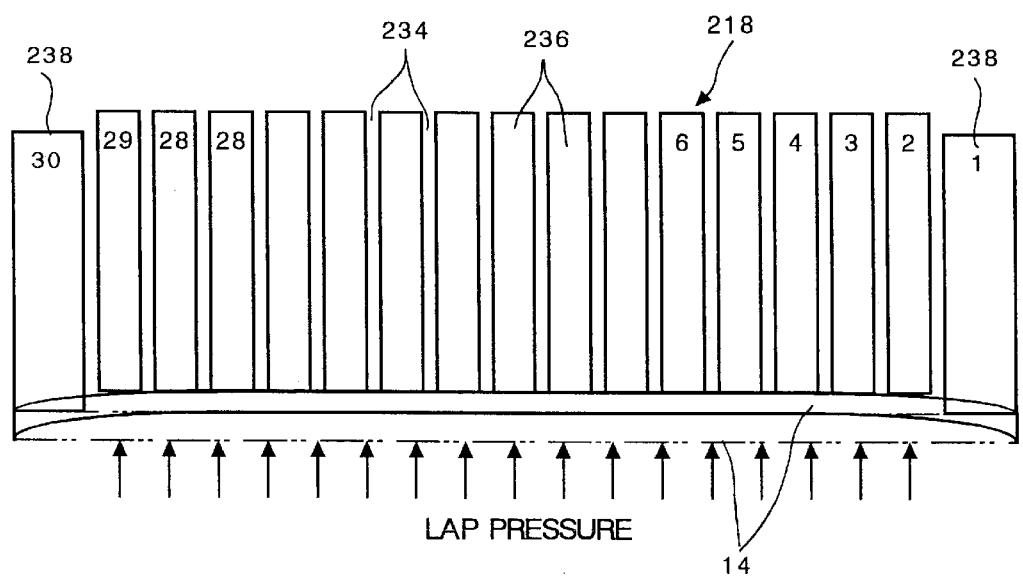

The row tool 218 has the plural bend cells 236 and the pair of fixed cells 238 formed on the opposite sides of the bend cells 236. Since the width of each fixed cell 238 is larger than the width of each bend cell 236, the rigidity of each fixed cell 238 is higher than the rigidity of each bend cell 236. Accordingly, in actually lapping the row bar 14 bonded to the row tool 218 as shown in FIG. 39, a distributed load (lap pressure) is applied from the lap plate 202 to the row bar 14 as shown in FIG. 40A, so that the bend cells 236 are deformed more than the fixed cells 238, and the row bar 14 is deformed so that its central portion is raised as shown in FIG. 40B.

Figure 41:
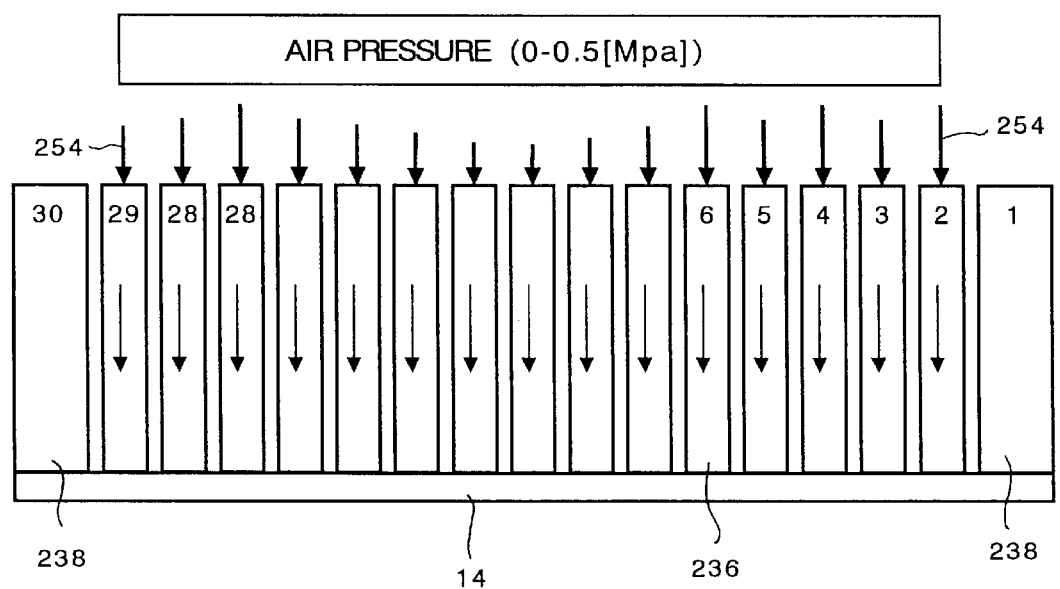
FIG. 41 is an elevational view for schematically illustrating a bend condition.

That is, the row bar 14 automatically becomes a "drawn" condition without the need for bending, and the row bar 14 is subjected to bend control from this offset condition, so that "drawing" is not required in the present invention. FIG. 41 is a schematic view for illustrating a bend condition. That is, the air pressure supplied to the air plate 220 is controlled in the range of 0 to 0.5 MPa to change the thrust applied to each bend cell 236 of the row tool 218 as shown by arrows 254 in FIG. 41. By performing difference control with the fixed cells 238 and arbitrarily displacing the bend cells 236, a target shape of the row bar 14 can be obtained to realize high-precision lapping.

Figure 42:
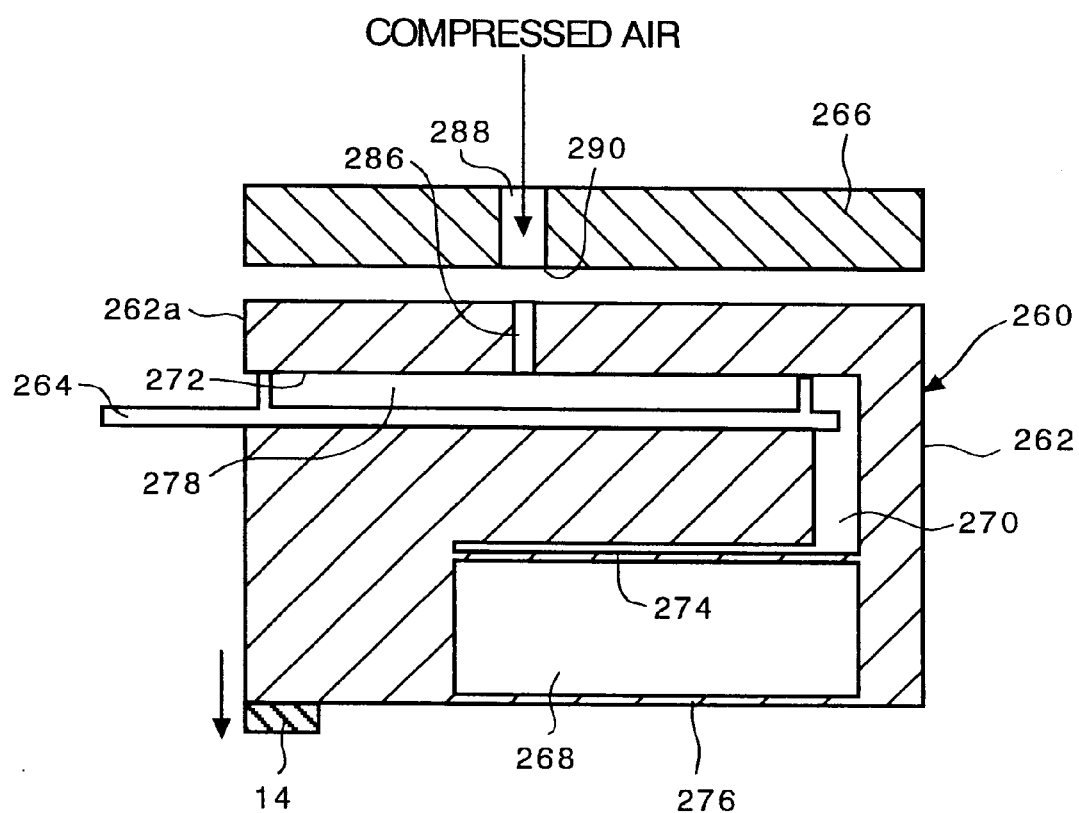
FIG. 42 is a sectional view of a row tool assembly employing an air lead frame.
Figure 43A:
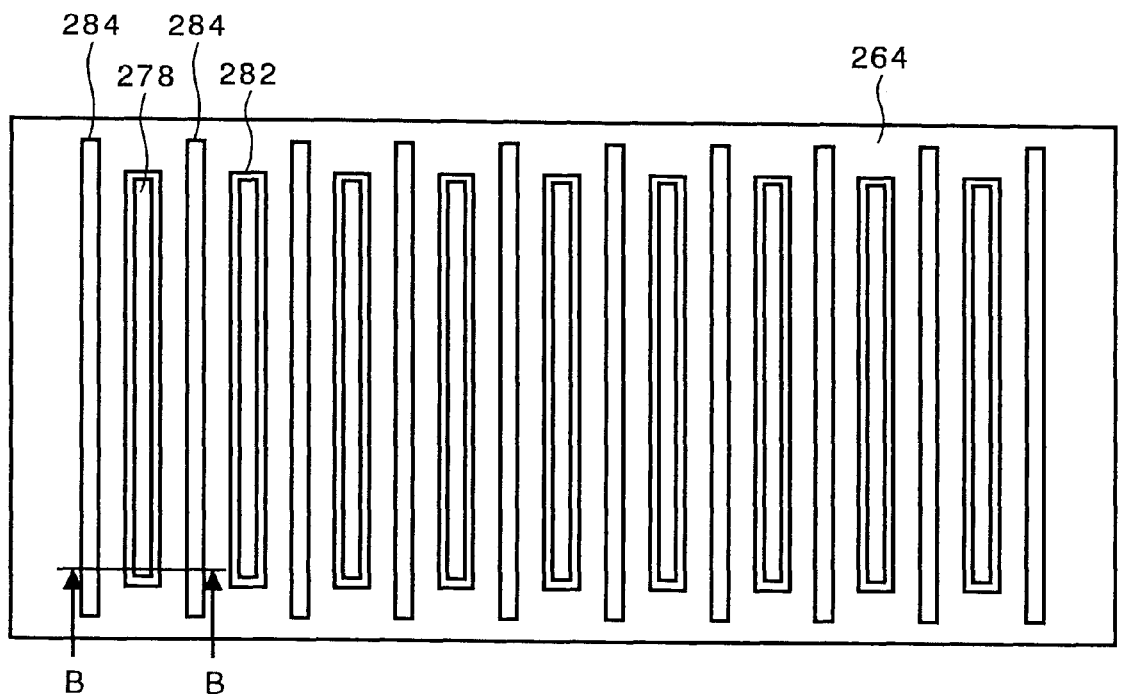
FIG. 43A is a plan view of the air lead frame.
Figure 43B:
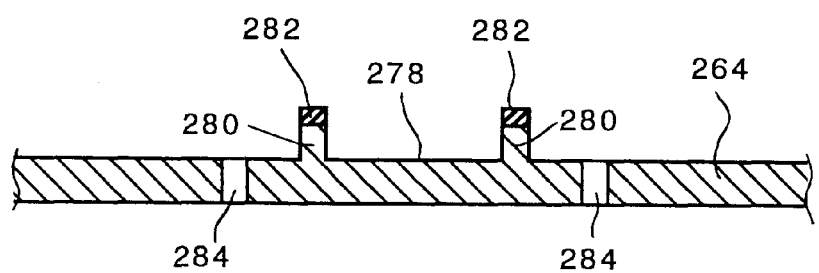
FIG. 43B is a cross section taken along the line B—B in FIG. 43A.

Referring to FIG. 42, there is shown a sectional view of a row tool assembly 260 employing an air lead frame 264. The row tool assembly 260 is composed of a row tool 262, the air lead frame 264 inserted in the row tool 262, and an air plate 266 fixed to the row tool 262. The row tool 262 has a rectangular hole 268, an L-shaped hole 270, and an insert hole 272 extending horizontally and opening to a front end surface 262a of the row tool 262. A pair of parallel thin-walled portions 274 and 276 are formed by the rectangular hole 268 and the L-shaped hole 270. These thin-walled portions 274 and 276 constitute a parallel spring mechanism The air lead frame 264 is inserted in the insert hole 272 of the row tool 262. FIG. 43A is a plan view of the air lead frame 264, and FIG. 43B is a cross section taken along the line B—B in FIG. 43A. As shown in FIGS. 43A and 43B, the air lead frame 264 has a plurality of oblong air reservoirs 278 each defined by a closed projection 280, and a plurality of slits 284 respectively corresponding to a plurality of slits (not shown) formed in the row tool 262. The air reservoirs 278 of the air lead frame 264 are formed by etching, for example. A rubber coating or resin coating 282 is provided on the upper end of each projection 280.

Like the row tool 218 shown in FIG. 37, the row tool 262 has a plurality of bend cells formed by the plural slits and a pair of fixed cells formed on the opposite sides of the bend cells. The row tool 262 is formed with a plurality of holes 286 respectively communicating with the plural air reservoirs 278 of the air lead frame 264 inserted in the row tool 262. The air plate 266 is formed with a plurality of holes 288 respectively communicating with the plural holes 286 of the row tool 262. A seal 290 such as an O-ring is interposed between each hole 286 of the row tool 262 and the corresponding hole 288 of the air plate 266, so as to prevent the air leakage.

The air lead frame 264 has a thickness of 0.2 mm or less. Since the air lead frame 264 is a thin sheet, the air lead frame 264 is deformed as shown by a phantom line in FIG. 42 by the air supplied into the air reservoirs 278, so that the row bar 14 is slightly displaced. Accordingly, by changing the supplied air pressure in an analog fashion by means of electro-pneumatic conversion regulators, the displacement of the row bar 14 can be arbitrarily set.

The air leakage from each air reservoir 278 of the air lead frame 264 can be prevented by the rubber coating or resin coating 282 coming into contact with the inner surface of the insert hole 272 of the row tool 262. Further, the air leakage from between the row tool 262 and the air plate 266 can be prevented by the seals 290. Accordingly, the contact surfaces of the row tool 262 and the air plate 266 in the row tool assembly 260 are not required to have a high flatness unlike the row tool 218 and the air plate 220 shown in FIG. 38.

Figure 44A:
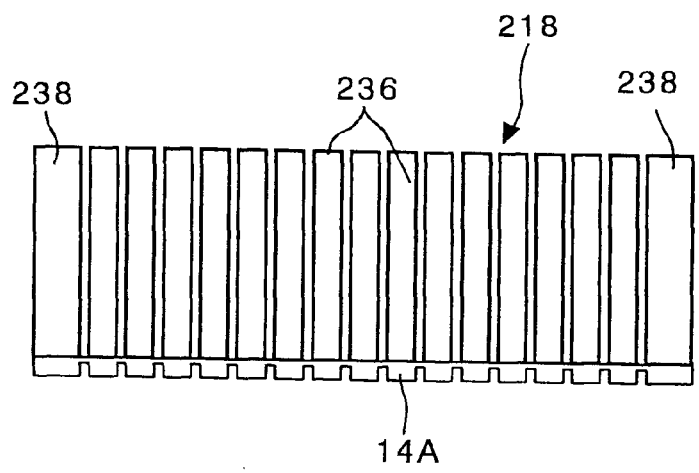
FIG. 44A is an elevational view showing a modification of the row bar bonded to the row tool, in which the row bar is semicut.
Figure 44B:
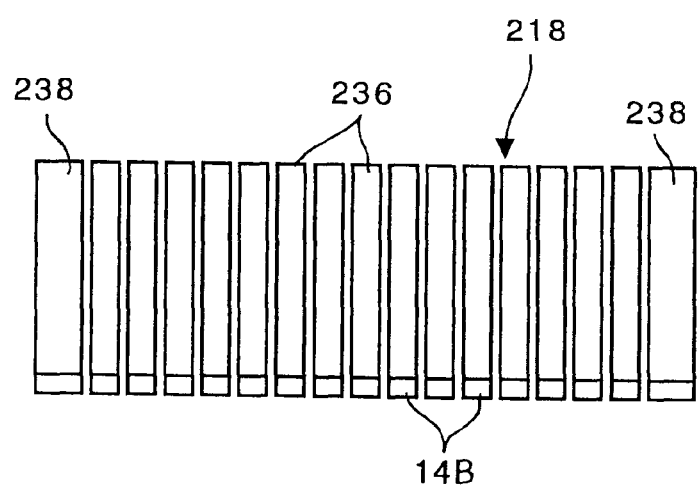
FIG. 44B is an elevational view showing another modification of the row bar bonded to the row tool, in which the row bar is completely cut.

While the row bar 14 is in the form of a flat bar in which a plurality of magnetic head elements are arranged in a row, the present invention is also applicable to a row bar 14A as shown in FIG. 44A or a row bar 14B shown in FIG. 44B. As shown in FIG. 44A, the row bar 14A is in the form of a partially cut bar such that a plurality of magnetic head elements are separated from each other. As shown in FIG. 44B, the row bar 14B is in the form of independent workpieces such that a plurality of magnetic head elements are completely isolated from each other.

According to the row bar preparation method of the present invention, the bonding and cutting are performed in the condition that the rigidity of each member is increased, so that the distortion and warpage of the row bar bonded to the row tool can be reduced to thereby improve the quality of products. According to the bonding apparatus of the present invention, the bonding of the row block and the dummy wafer or the bonding of the integrated block and the row tool can be efficiently performed.

According to the row bar lapping method and lapping apparatus of the present invention, the displacement of the row bar can be controlled at multiple points, so that a target shape of the row bar can be easily obtained to realize high-precision lapping.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An apparatus for lapping a row bar having a plurality of head elements arranged in a row, comprising:
   a lap plate for providing a lapping surface;
   a row tool having a plurality of bend cells formed by a plurality of slits;
   a presser mechanism for pressing said row tool toward said lapping surface of said lap plate; and
   a compressed air source for supplying an air pressure to each of said bend cells.

2. An apparatus according to claim 1, further comprising:
   an air plate fixed to an upper surface of said row tool and having a plurality of holes respectively corresponding to said plurality of bend cells; and
   a plurality of electro-pneumatic conversion regulators provided between said compressed air source and said air plate and respectively connected to said plurality of holes of said air plate.

3. An apparatus according to claim 1, wherein said row tool further has a parallel spring mechanism and a pair of fixed cells formed on the opposite sides of said bend cells, each of said fixed cells having a width larger than that of each of said bend cells.

4. An apparatus according to claim 3, wherein said presser mechanism has a lap head for pressing said row bar on said lapping surface by a self-weight, and a pneumatic cylinder for adjustably applying a lapping pressure to said lap head.

5. A method of lapping a row bar having a plurality of head elements arranged in a row, comprising the steps of:
   providing a lapping surface by a lap plate;
   pressing said row bar bonded to a lower surface of a row tool having a plurality of bend cells formed by a plurality of slits, against said lapping surface; and
   applying individually adjustable air pressures to said bend cells, respectively;
   whereby said row bar is displaced at multiple points in lapping.

6. A row tool to which a row bar having a plurality of head elements arranged in a row is adapted to be bonded, comprising:
   a plurality of bend cells formed by a plurality of slits;
   a pair of fixed cells formed on the opposite sides of said bend cells, each of said fixed cells having a width larger than that of each of said bend cells; and
   a parallel spring mechanism.

7. A row tool according to claim 6, wherein said row tool has an upper surface having a flatness of 3 $\mu$m or less.

8. A row tool assembly comprising:
   a row tool having an upper surface, a plurality of bend cells formed by a plurality of slits, a parallel spring mechanism, an insert hole extending horizontally, and a plurality of first holes communicating with said insert hole and opening to said upper surface;
   an air lead frame inserted in said insert hole of said row tool and having a plurality of air reservoirs respectively communicating with said first holes of said row tool; and an air plate fixed to said upper surface of said row tool and having a plurality of second holes respectively communicating with said first holes of said row tool.

9. A row tool assembly according to claim 8, wherein:

said air lead frame further has a plurality of second slits respectively corresponding to said slits of said row tool; and each of said air reservoirs is defined by a closed projection;

said closed projection having an upper end provided with a coating kept in contact with an inner surface of said insert hole of said row tool.

\* \* \* \* \*